(12) United States Patent
Kondoh et al.

(10) Patent No.: US 7,167,798 B2
(45) Date of Patent: Jan. 23, 2007

(54) RISK POTENTIAL CALCULATION DEVICE AND DRIVING ASSIST SYSTEM

(75) Inventors: Takayuki Kondoh, Yokosuka (JP); Tomohiro Yamamura, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 377 days.

(21) Appl. No.: 10/856,820

(22) Filed: Jun. 1, 2004

(65) Prior Publication Data
US 2004/0249549 A1 Dec. 9, 2004

(30) Foreign Application Priority Data
Jun. 4, 2003 (JP) ............... 2003-159297

(51) Int. Cl.
*G06F 19/00* (2006.01)
(52) U.S. Cl. ............... 701/301; 701/36; 701/96; 340/435; 340/436; 340/903
(58) Field of Classification Search ............... 701/36, 701/70, 93, 96, 300, 301; 340/435, 436, 340/903; 342/455; 180/167, 169, 170
See application file for complete search history.

(56) References Cited

U.S. PATENT DOCUMENTS

| | | | | |
|---|---|---|---|---|
| 6,832,157 B1 * | 12/2004 | Egami | ............... | 701/301 |
| 6,917,872 B1 * | 7/2005 | Egami | ............... | 701/96 |
| 6,982,647 B1 * | 1/2006 | Kuge et al. | ............... | 340/576 |
| 7,006,917 B1 * | 2/2006 | Hijikata | ............... | 701/301 |
| 2004/0059482 A1 * | 3/2004 | Hijikata | ............... | 701/36 |
| 2004/0172185 A1 * | 9/2004 | Yamamura et al. | ............... | 701/96 |
| 2005/0033517 A1 * | 2/2005 | Kondoh et al. | ............... | 701/301 |
| 2005/0065687 A1 * | 3/2005 | Hijikata et al. | ............... | 701/41 |

FOREIGN PATENT DOCUMENTS

| | | |
|---|---|---|
| DE | 196 20 929 A1 | 11/1997 |
| DE | 199 44 556 A1 | 3/2001 |
| EP | 0 612 641 A1 | 8/1994 |
| EP | 1 055 0542 | 11/2000 |

(Continued)

OTHER PUBLICATIONS

U.S. Appl. No. 10/336,802, filed Jan. 6, 2003, Hijikata et al.

(Continued)

*Primary Examiner*—Gary Chin
(74) *Attorney, Agent, or Firm*—McDermott Will & Emery LLP

(57) ABSTRACT

A risk potential calculating device for a vehicle, comprises a state recognition device that detects vehicle conditions of a subject vehicle and a traveling environment for vehicle surroundings; and a risk potential calculator that calculates a risk potential for the vehicle surroundings based on detection results of the state recognition device. The risk potential calculator calculates the risk potential by respectively calculating a first risk potential expressing a risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by the second coefficient.

18 Claims, 21 Drawing Sheets

FOREIGN PATENT DOCUMENTS

| | | |
|---|---|---|
| JP | 10-166889 | 6/1998 |
| JP | 10-166890 | 6/1998 |
| JP | 2000-54860 A | 2/2000 |
| WO | WO 03/006290 A1 | 1/2003 |

OTHER PUBLICATIONS

U.S. Appl. No. 10/656,173, filed Sep. 8, 2003, Hijikata.
U.S. Appl. No. 10/462,749, filed Jun. 17, 2003, Egami.
U.S. Appl. No. 10/226,232, filed Aug. 23, 2002, Yamamura et al.

* cited by examiner

RISK POTENTIAL CALCULATION DEVICE AND DRIVING ASSIST SYSTEM

BACKGROUND OF THE INVENTION

1. Field of the Invention

The present invention relates to technology for calculating risk potential for vehicle surroundings to assist operations carried out by a driver, and particularly relates to a driving assist system for assisting operations of a driver.

2. Description of Related Art

As a system for assisting driver operations, there is known the one disclosed in Japanese Laid-open Patent Publication No. H10-166889. This system changes reaction force of an acceleration pedal based on a distance between a preceding vehicle and the vehicle in question detected by an inter-vehicle distance detector. This system gives a warning to a driver by increasing reaction force of the acceleration pedal as the distance between vehicles decreases.

SUMMARY OF THE INVENTION

With the risk potential calculation device for vehicle and driving assist system for vehicle, it is wished for risk actually felt by a driver to be accurately estimated according to the traveling conditions for the vehicle surroundings, and for accelerator pedal reaction force control to be carried out in line with the risk felt by the driver.

A risk potential calculating device for a vehicle according to the present invention, comprises a state recognition device that detects vehicle conditions of a subject vehicle and a traveling environment for vehicle surroundings; and a risk potential calculator that calculates a risk potential for the vehicle surroundings based on detection results of the state recognition device, wherein the risk potential calculator calculates the risk potential by respectively calculating a first risk potential expressing a risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by the second coefficient.

A vehicle driving assist system according to the present invention, comprises a state recognition device that detects vehicle conditions of a subject vehicle and a traveling environment for vehicle surroundings; a risk potential calculator that calculates a risk potential for the vehicle surroundings based on detection results of the state recognition device; a reaction force calculating device that calculates an operation reaction force to be generated at a vehicle operation equipment according to the risk potential calculated by the risk potential calculator; and a reaction force generating device that generates the operation reaction force calculated by the reaction force calculating device at the vehicle operation equipment, wherein the risk potential calculator calculates the risk potential by respectively calculating a first risk potential expressing a risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by the second coefficient.

A vehicle according to the present invention, comprises a vehicle driving assist system that comprises (a) a state recognition device that detects vehicle conditions of a subject vehicle and a traveling environment for vehicle surroundings; (b) a risk potential calculator that calculates a risk potential for the vehicle surroundings based on detection results of the state recognition device; (c) a reaction force calculating device that calculates an operation reaction force to be generated at a vehicle operation equipment according to the risk potential calculated by the risk potential calculator; and (d) a reaction force generating device that generates the operation reaction force calculated by the reaction force calculating device at the vehicle operation equipment, wherein the risk potential calculator calculates the risk potential by respectively calculating a first risk potential expressing a risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by the second coefficient.

A risk potential calculating device for a vehicle according to the present invention, comprises a state recognition means for detecting vehicle conditions of a subject vehicle and a traveling environment for vehicle surroundings; and a risk potential calculating means for calculating a risk potential for the vehicle surroundings based on detection results of the state recognition means, wherein the risk potential calculating means calculates the risk potential by respectively calculating a first risk potential expressing risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by the second coefficient.

A risk potential calculating method according to the present invention, detects vehicle conditions of a subject vehicle and a traveling environment for vehicle surroundings; calculates a first risk potential expressing a risk in a case where driving conditions of the subject vehicle are in a steady state and a second risk potential expressing a risk for a case where driving conditions of the subject vehicle are in a transient state based on the detected vehicle conditions and traveling environment; calculates a weighting variable for setting weighting of the first risk potential and the second risk potential based on the vehicle conditions and traveling environment; determines a first coefficient multiplied to the first risk potential and a second coefficient multiplied to the second risk potential based on the calculated weighting variable; and calculates a risk potential for the vehicle surroundings by adding the first risk potential multiplied by the first coefficient and the second risk potential multiplied by the second coefficient.

DESCRIPTION OF THE PREFERRED EMBODIMENTS

First Embodiment

Figure 1:
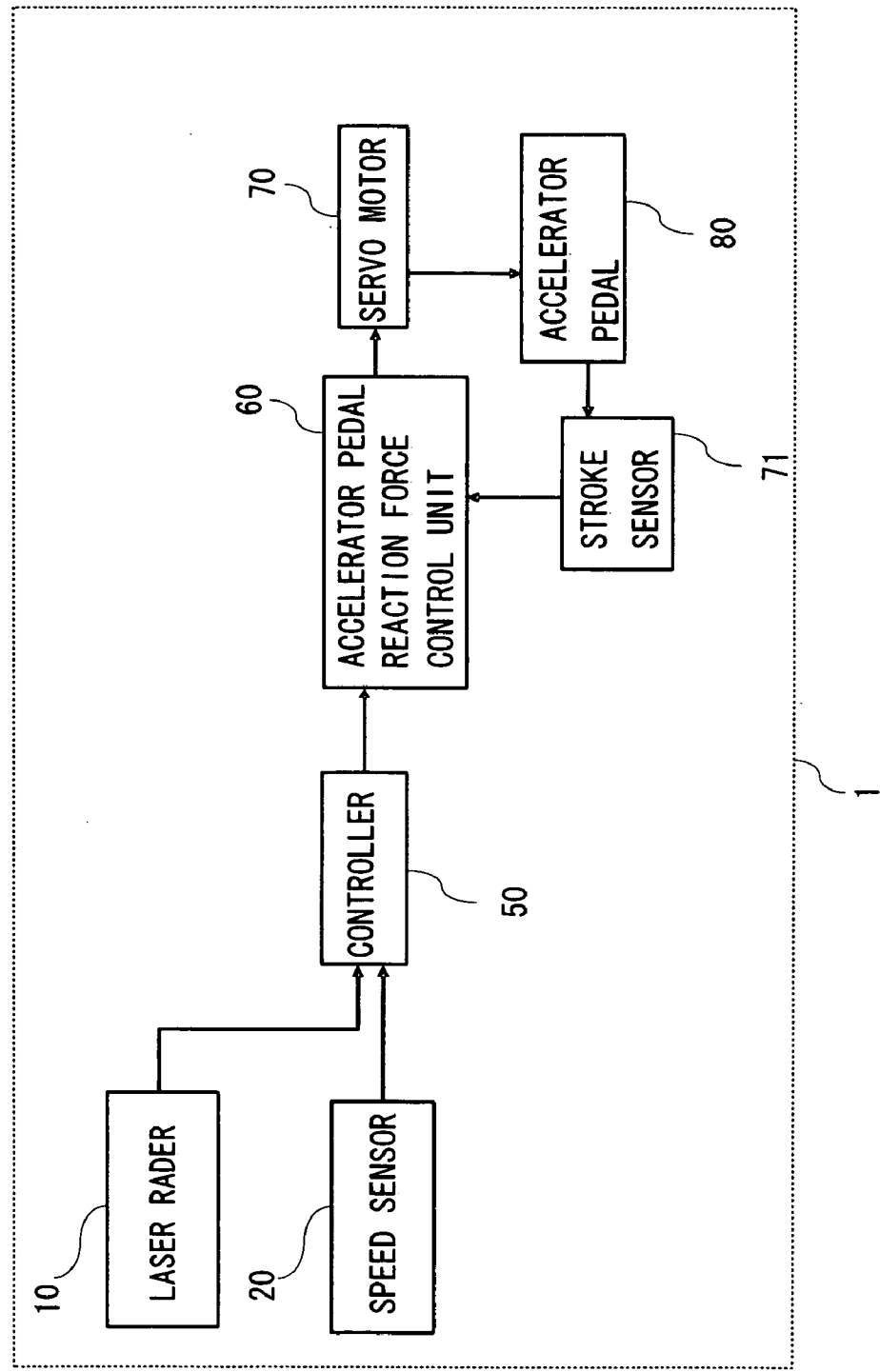
FIG. 1 is a system view of a vehicle driving assist system of a first embodiment of the present invention.
Figure 2:
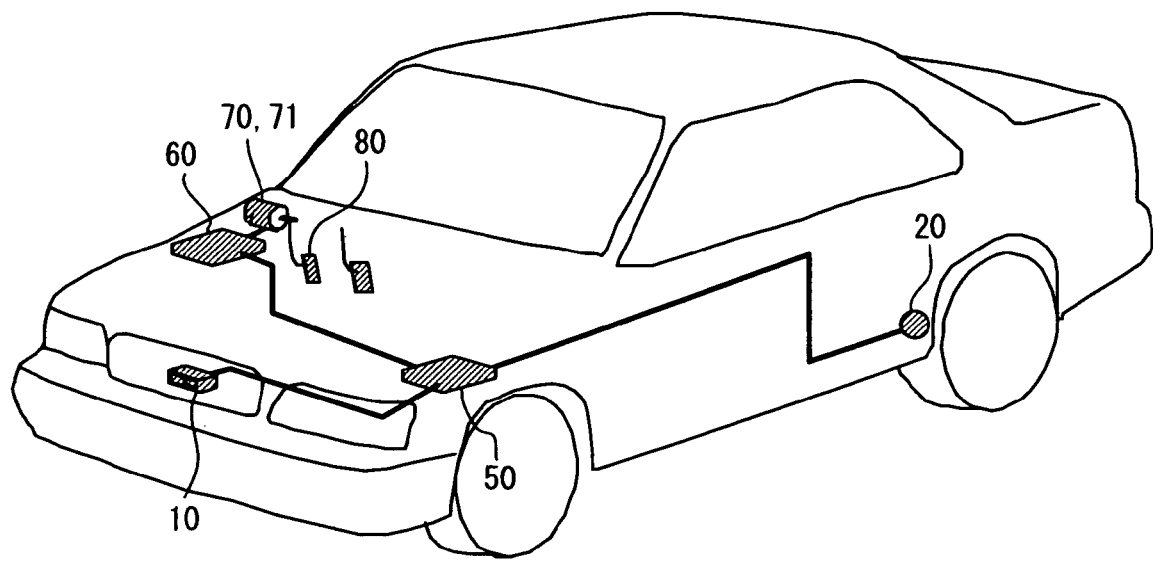
FIG. 2 is a structural drawing of a vehicle fitted with the vehicle driving assist system shown in FIG. 1.

FIG. 1 is a system drawing showing the structure of a vehicle driving assist system 1 of the first embodiment of the present invention, and FIG. 2 is a structural drawing of a vehicle fitted with the vehicle driving assist system 1.

First of all the structure of the vehicle driving assist system 1 will be described. A laser radar 10 is attached to a front grill section of a vehicle or to a bumper etc., and irradiates infrared light pulses forwards in a horizontal direction so as to scan the region ahead of the vehicle. The laser radar 10 measures reflected waves of infrared light pulses reflected by a plurality of reflecting objects ahead (normally the rear of vehicles in front), and detects a distance between a preceding vehicle and the subject vehicle and a relative velocity to the preceding vehicle based upon the length of time the reflected waves take to reach the laser radar. The detected distance between vehicles and relative velocity are output to a controller 50. Forward regions scanned by the laser radar 10 are about ±6°, with respect to the longitudinal centerline of the subject vehicle and objects present ahead of the subject vehicle existing within this range can be detected.

A speed sensor 20 detects a speed of the subject vehicle by measuring rotational speed of wheels or rotational speed of the output side of a transmission and outputs detected vehicle speed to the controller 50.

The controller 50 comprises a CPU and CPU peripheral devices, such as ROM, RAM etc., and performs overall control of the vehicle driving assist system 1. The controller 50 calculates a risk potential for a preceding vehicle running in front of the subject vehicle as described later based on signals such as the speed of the subject vehicle, distance between vehicles and relative velocity input from the vehicle speed sensor 20 and the laser radar 10. Further, a reaction force instruction value is calculated based on the calculated risk potential and outputted to an accelerator pedal reaction force controlling device (an AF controlling device) 60.

Figure 3:
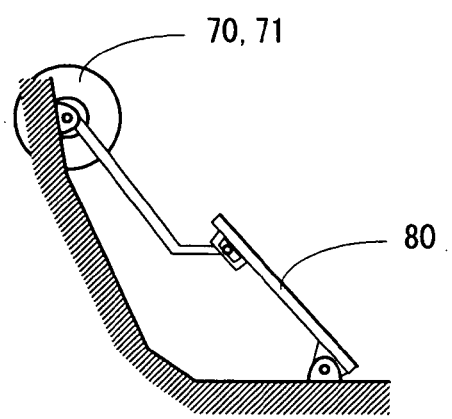
FIG. 3 is a structural drawing of an accelerator pedal and the vicinity thereof.

The AF controlling device 60 controls an accelerator pedal operation reaction force in response to the instruction values from the controller 50. As shown in FIG. 3, a servo motor 70 and an accelerator pedal stroke sensor 71 are connected to an accelerator pedal 80 via a link mechanism. At the servo motor 70, torque and rotation angle are controlled in response to commands from the AF control device 60 so that the level of operation reaction force generated when the driver operates the accelerator pedal 80 can be controlled through the servo motor 70 as desired. The accelerator pedal stroke sensor 71 detects stroke amount (depression amount) S of the accelerator pedal 80 converted to a rotation angle of the servo motor 70 via a link mechanism.

Figure 6:
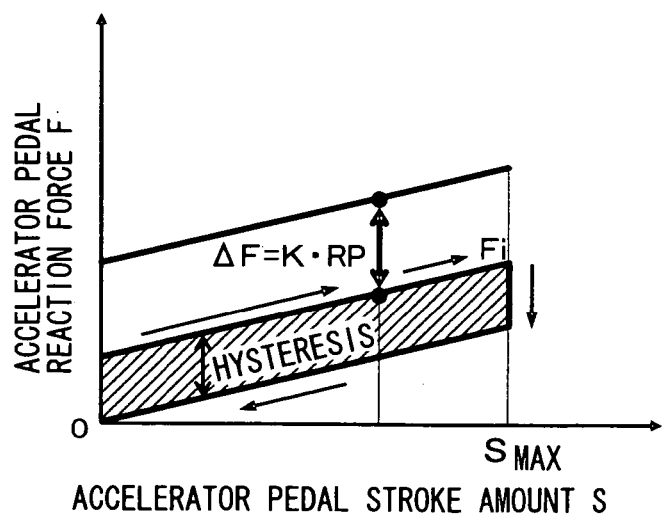
FIG. 6 is a drawing showing a characteristic of acceleration pedal reaction force with respect to an acceleration pedal stroke amount.

Normal accelerator pedal reaction force characteristics Fi when control of accelerator pedal reaction force is not carried out are set so that, for example, reaction force of the accelerator pedal becomes larger in a linear manner as the stroke amount S becomes larger (refer to FIG. 6). The normal accelerator pedal reaction force characteristic Fi can be implemented, for example, using spring force of a torsion spring (not shown in the drawings) provided at the center of rotation of the accelerator pedal 80.

Figure 4:
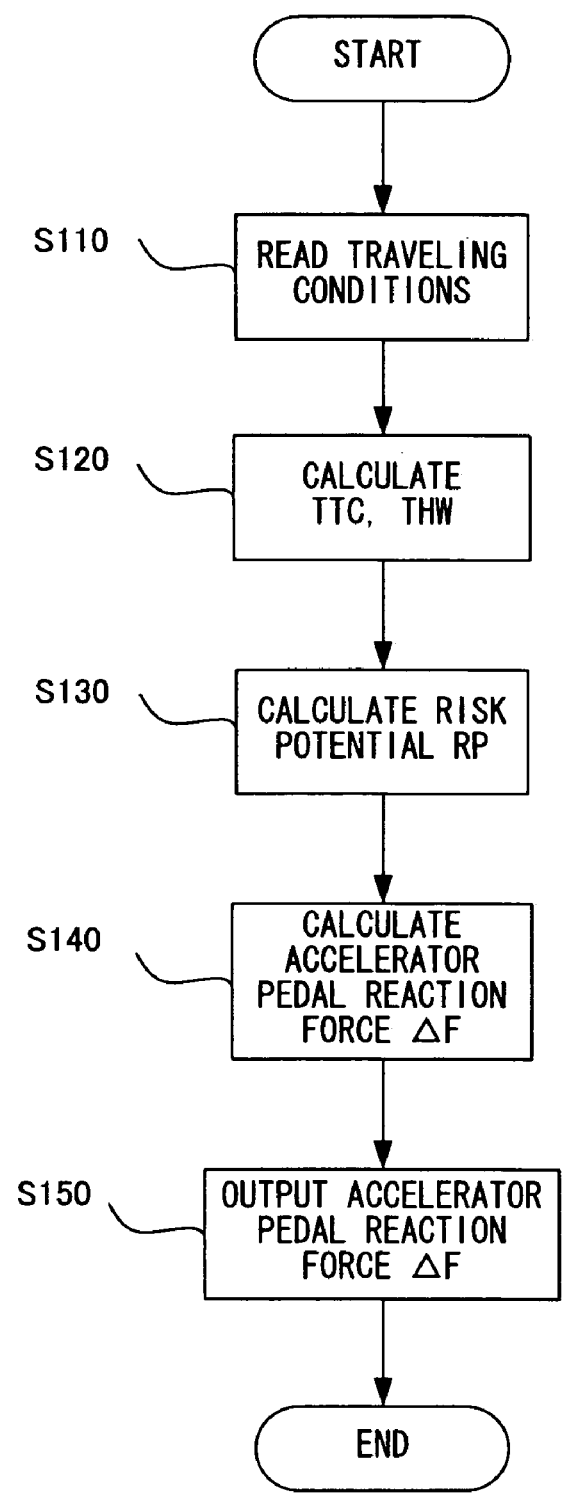
FIG. 4 is a flow chart showing a processing sequence for a drive operation assist control program of a controller of the first embodiment.

Next, operation of the vehicle driving assist system 1 of the present invention will be described. FIG. 4 is a flowchart showing a processing sequence for a drive operation assist control program implemented in the controller 50. The content of this processing is carried out continuously at fixed intervals (for example, 50 msecs).

Figure 5:
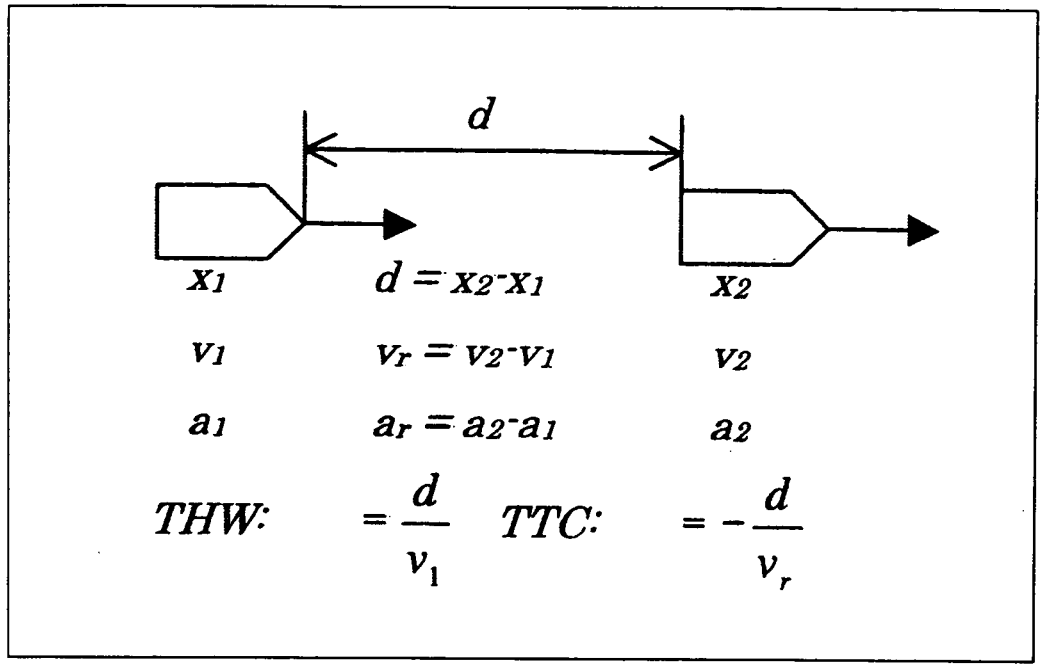
FIG. 5 is a schematic drawing showing traveling conditions of a subject vehicle and a preceding vehicle.

In step S110, running conditions of the subject vehicle and the vehicle surroundings are read in from the laser radar 10 and the vehicle speed sensor 20. Driving conditions of the subject vehicle and a preceding vehicle running ahead of the subject vehicle are schematically shown in FIG. 5. Parameters representing running conditions of the vehicle are a current position of the subject vehicle in the longitudinal direction of the vehicle x1, a subject vehicle speed v1, and a subject vehicle acceleration a1. Parameters representing running conditions of the preceding vehicle are a current position of the preceding vehicle in the longitudinal direction of the preceding vehicle x2, a preceding vehicle speed v2 and a preceding vehicle acceleration a2. A distance between the subject vehicle and the preceding vehicle d=x2−x1, a relative velocity vr=v2−v1, and a relative acceleration ar=a2−a1.

In step S120, a time to contact TTC and a time headway THW with respect to the preceding vehicle are calculated using parameters read in step S110.

The time to contact TTC is a physical quantity representing current degree of closeness of the subject vehicle to a preceding vehicle. In the case where current driving conditions are continuous, that is, when the vehicle speed v1, preceding vehicle speed v2 and relative velocity vr are constant, the time to contact TTC is a value representing how many seconds later the distance between vehicles d will become zero and the subject vehicle and the preceding vehicle come into mutual contact. The time to contact TTC can be obtained from the following (equation 1).

$$TTC = -d/vr \qquad \text{(Equation 1)}$$

The smaller is the absolute value of the TTC, the greater is the degree of closeness to the preceding vehicle, and this indicates more tense situation with possible contact between the subject vehicle and the preceding vehicle. For example, when the subject vehicle is approaching towards the preceding vehicle, it is know that almost every driver will have started to perform deceleration operation before the TTC becomes less than four seconds.

The time headway THW is a physical quantity representing predicted degree of influence on the time to contact TTC due to variation in speed of a preceding vehicle when the subject vehicle is following the preceding vehicle. In other words, the THW expresses degree of influence upon the TTC when it is assumed that the relative velocity vr changes. The THW is represented by the following (equation 2).

$$THW = d/v1 \qquad \text{(Equation 2)}$$

The time headway THW is given by dividing the distance between vehicles d by the subject vehicle speed v1, and it represents a time period until the subject vehicle reaches the current position of the preceding vehicle. As this THW becomes larger, the predicted degree of influence with respect to changes in surrounding environment of the subject vehicle becomes smaller. That is, if the THW is large, there is not a lot of influence on the degree of closeness to the preceding vehicle even if the preceding vehicle speed changes in the future, representing that the TTC does not vary a great deal. In the event that the subject vehicle follows the preceding vehicle and the subject vehicle speed v1 equals the preceding vehicle speed v2, then by substituting the preceding vehicle speed v2 for the subject vehicle speed v1 in (equation 2) it is also possible to calculate the THW.

In step S130, a risk potential RP with respect to the preceding vehicle is calculated using the TTC and THW calculated in step S120. The method of calculating the risk potential RP will be described later.

In step S140, an accelerator pedal reaction force increase amount (AF increase amount) ΔF is calculated based on the risk potential RP calculated in step S130. The AF increase amount ΔF increases as the risk potential RP becomes larger, and is set, for example, so as to be proportional to the risk potential RP (ΔF=k·RP, where k is a preset constant).

Next, in step S150, the AF increase amount ΔF calculated in step S140 is output to the AF controlling device 60. The AF controlling device 60 controls the servo motor 70 so as to generate the accelerator pedal reaction force F that is the AF increase amount ΔF added to the normal reaction force characteristic Fi, in response to a command from the controller 50. The relationship between the acceleration pedal stroke amount S and the acceleration pedal reaction force F is shown in FIG. 6. As shown in FIG. 6, as the risk potential RP becomes larger, a larger acceleration pedal reaction force F is generated. This terminates the processing for this time.

In this way, the risk potential RP is recognized by the driver by controlling the accelerator pedal reaction force and outputting a warning in accordance with the risk potential RP and thus, assistance is provided to the driver by prompting the driver to perform a drive operation in an appropriate direction.

In the following, a method of calculating the risk potential RP in the first embodiment will be described. It is preferable to transmit risk actually felt by the driver to the driver as the acceleration pedal reaction force F when performing acceleration pedal reaction force control based on the risk potential RP with respect to the vehicle surroundings. Risk actually felt by the driver when driving changes depending on the driving conditions for the vehicle surroundings. For example, even when the relative velocity vr and inter-vehicle distance d between the subject vehicle and the preceding vehicle are the same at a certain time, the driver feels differing risk in the case where the subject vehicle follows the preceding vehicle with the relative velocity vr at zero and with the inter-vehicle distanced fixed, i.e. in a steady state, and in the case where the relative velocity vr and the inter-vehicle distance d change so that the subject vehicle approaches the preceding vehicle, i.e. in a transient state.

In the first embodiment, risk in the case where it is assumed that the driving conditions for the vehicle surroundings are in the steady state and risk where the transient state is assumed are defined individually, and the risk potential RP is calculated in line with the perception of the driver. Specifically, the risk potential RP is calculated in line with the perception of the driver by taking the reciprocal of the THW calculated by (Equation 2) as a risk potential RPsteady occurring in the steady state, and taking the reciprocal of the TTC calculated using (Equation 1) as a risk potential RPtransient occurring in the transient state, and setting appropriate weightings for the RP steady and RPtransient, respectively.

The risk potential RP is calculated using (Equation 3) below.

$$RP = \left(\frac{\alpha}{k}\right) RP_{steady} + \left(1 - \frac{\alpha}{k}\right) RP_{transient} \qquad \text{(Equation 3)}$$

Here, the steady term, that is the RPsteady, is 1/THW, and the transient term, that is RPtransient, is 1/TTC, with the respectively multiplied weightings being wa=α/k, wb=(1−α/k). k is a constant for deciding an absolute weighting for the steady term RPsteady and the transient term RPtransient, and is set appropriately in advance according to the results of tests, etc. α is a variable for deciding a travel scene for the steady state and the transient state dynamically using the travel state of the subject vehicle and the preceding vehicle. The weighting wa applied to the steady term RPsteady and the weighting wb applied to the transient term RPtransient are such that wa<wb. A method for setting the variable α is described in the following.

The variable α is a value for deciding the weightings wa and wb applied to the steady term RPsteady and transient term RPtransient, and decides the weightings (proportion) between the steady state and transient state in the traveling conditions for the current vehicle surroundings. Here, the variable α is calculated using a necessary deceleration an. The necessary deceleration an is calculated based on the current inter-vehicle distance d and relative velocity vr between the subject vehicle and the preceding vehicle, and is the deceleration required at the subject vehicle in order to avoid a mutual contact with the preceding vehicle. Namely, the necessary deceleration an represents the urgency with which the driver is to start a deceleration operation necessary to avoid a mutual contact in the current vehicle driving conditions and the operation amount required during this time. The necessary deceleration an is expressed by an=vr$^2$/2d. It can be said that for a large necessary deceleration an, the necessity to start a deceleration operation urgently is higher and also a larger extent of the deceleration operation is required.

The variable a can be calculated from equation (4) using the necessary deceleration an.

$$\alpha = 1 - an/an_0 \quad \text{(Equation 4)}$$

where $0 \leq \alpha \leq 1$. $an_0$ is a predetermined necessary deceleration taken as a reference, and is set appropriately in advance from results of tests, etc.

Figure 7:
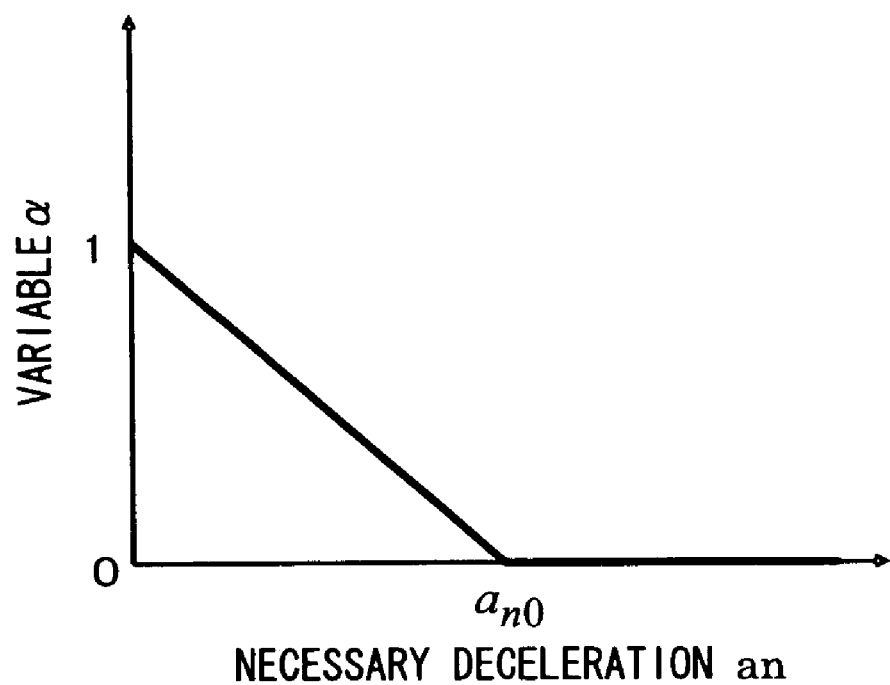
FIG. 7 is a view showing the relationship between a necessary deceleration and a variable α.

The relationship between the necessary deceleration an and the variable α is shown in FIG. 7. As shown in FIG. 7, when the necessary deceleration an=0, a situation where the traveling conditions for the vehicle surroundings are in a completely steady state is shown by the variable α=1. When the necessary deceleration an becomes large, the variable α falls, so that the steady state and the transient state co-exist (0<α<1), and when the necessary deceleration an≧an0, a completely transient state where variable α=0 is attained.

The risk potential RP for the vehicle surroundings is calculated using (Equation 3) described above using the variable α calculated based on the current necessary deceleration an of the subject vehicle with respect to he preceding vehicle. A necessary deceleration reference value an0 and constant k are set to, for example, an0=1.0, k=9.

Figure 8:
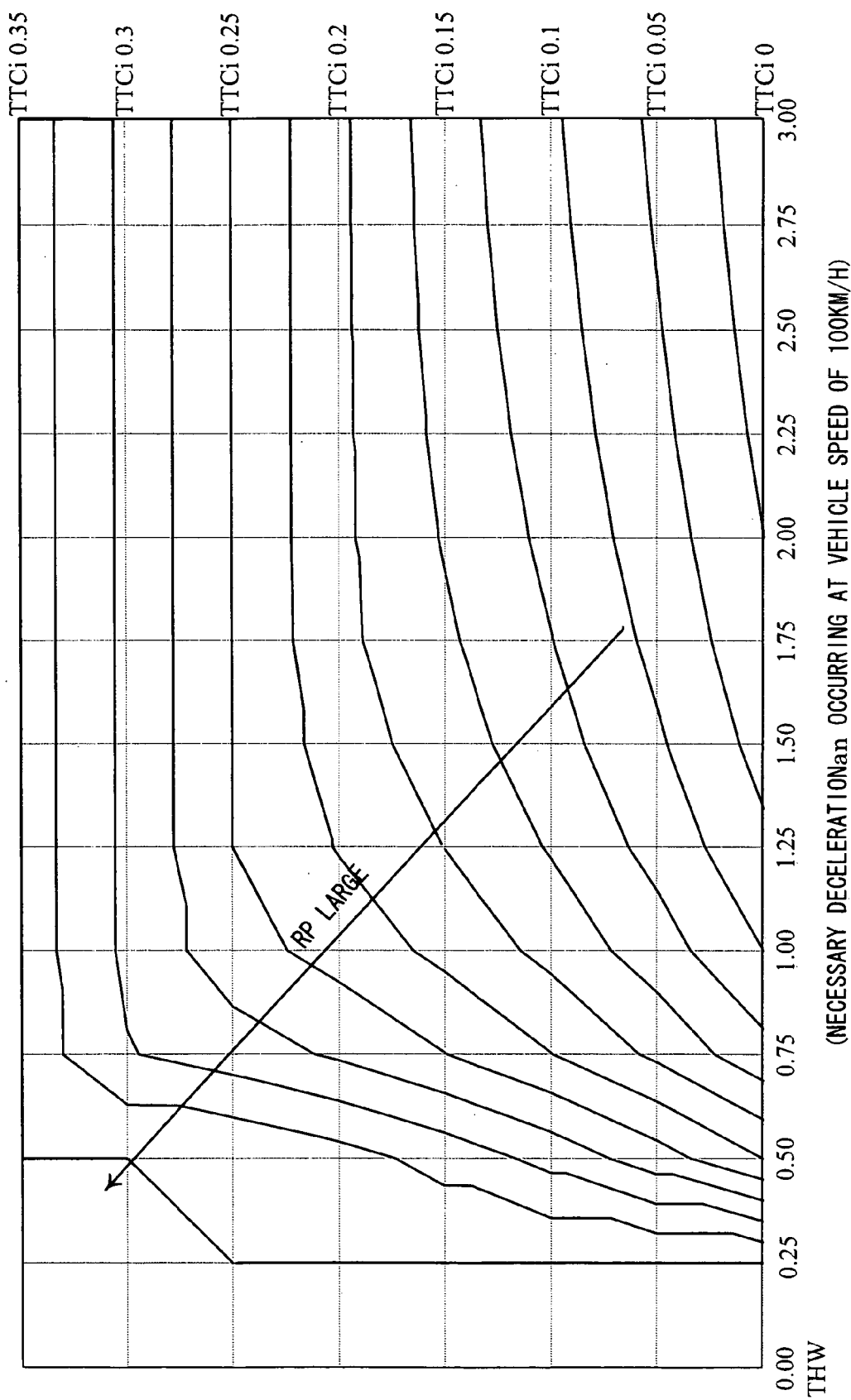
FIG. 8 is a view showing characteristics of a risk potential with respect to a reciprocal of time to contact and a time headway for the case of calculating the variable a from the necessary deceleration.
Figure 9:
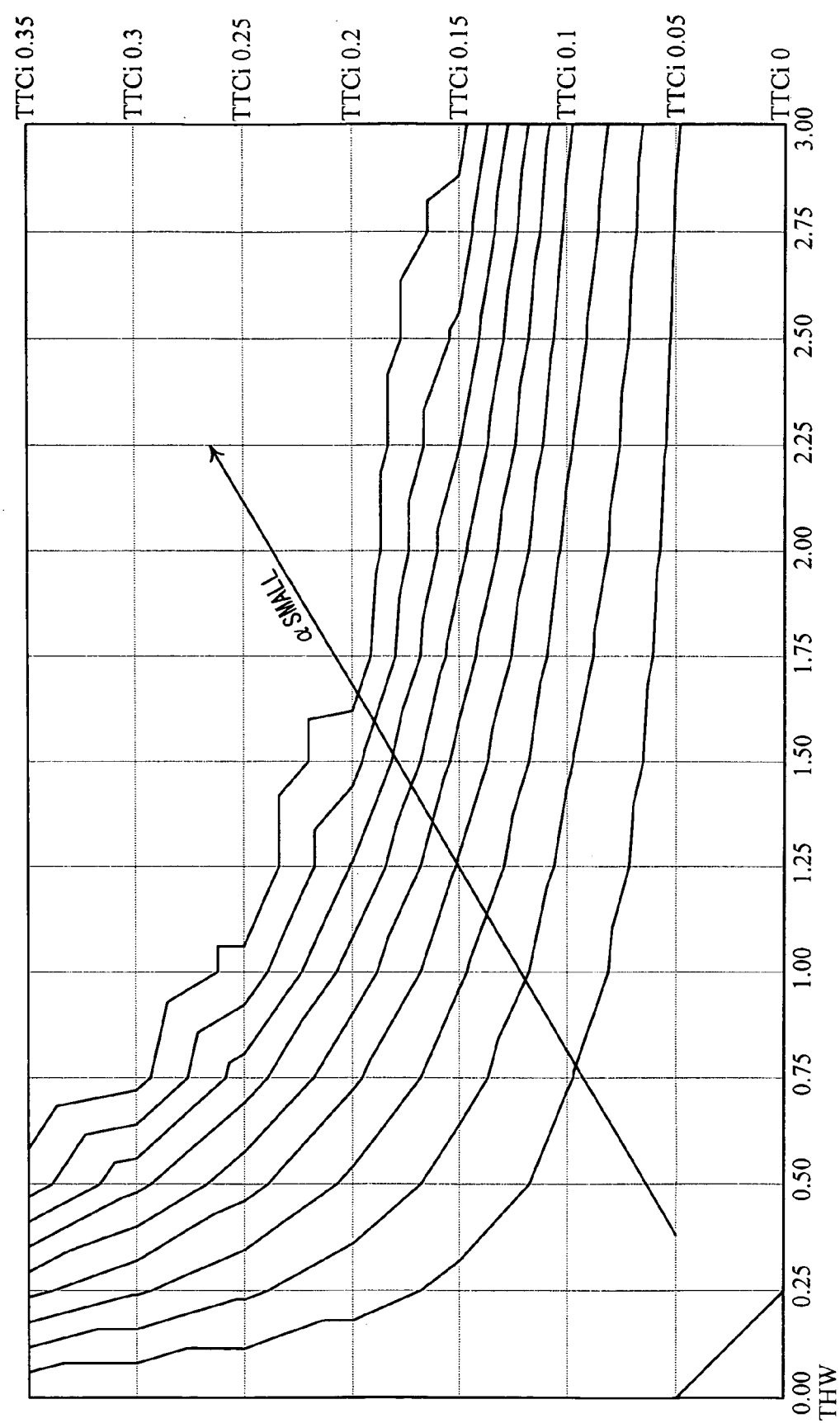
FIG. 9 is a view showing change in the variable a corresponding to FIG. 8.
Figure 10:
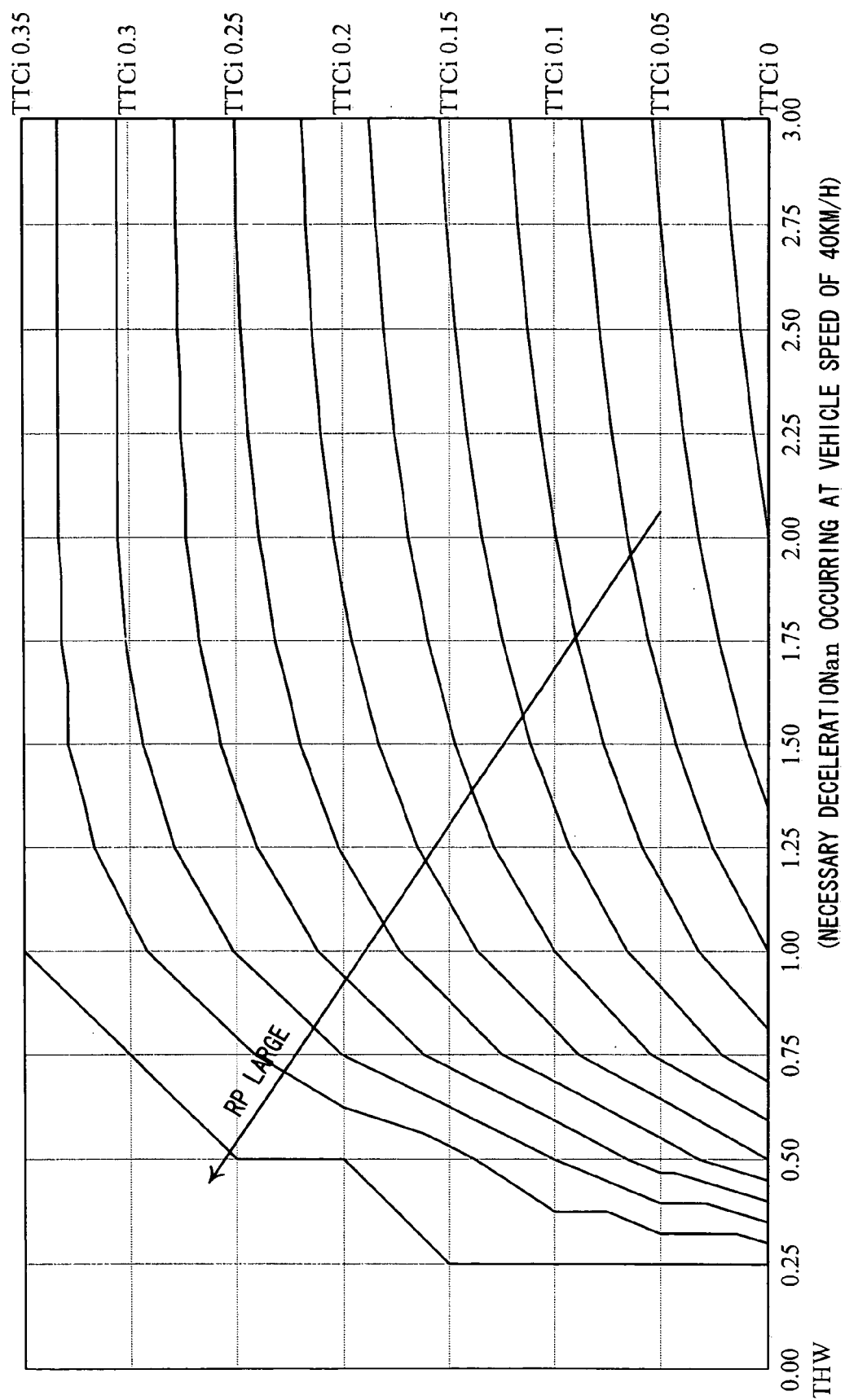
FIG. 10 is another view showing characteristics of a risk potential with respect to a reciprocal of time to contact and a time headway for the case of calculating the variable α from the necessary deceleration
Figure 11:
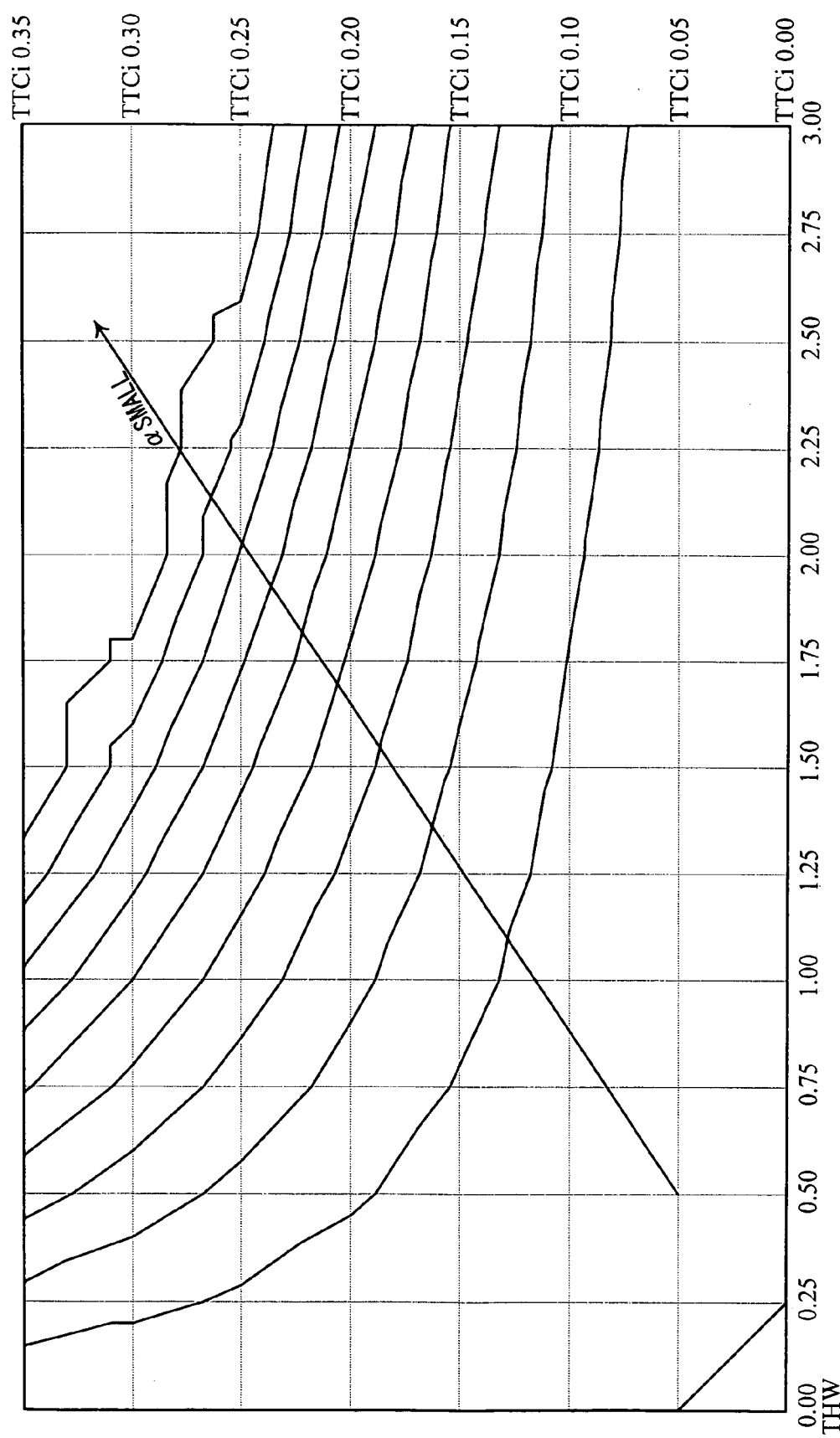
FIG. 11 is a view showing change in the variable α corresponding to FIG. 10.

A risk potential map of the case where the variable α is set using the necessary deceleration an occurring at the vehicle speed v1=100 km/h is shown in FIG. 8, and change in the variable α corresponding to the risk potential map of FIG. 8 is shown in FIG. 9. In FIG. 8 and FIG. 9, the vertical axis shows the reciprocal TTCi of the time to contact and the horizontal axis shows the time headway THW. Similarly, a risk potential map of the case where the variable α is set using the necessary deceleration an occurring at the vehicle speed v1=40 km/h is shown in FIG. 10, and change in the variable a corresponding to the risk potential map of FIG. 10 is shown in FIG. 11. In FIG. 8 and FIG. 10, the necessary deceleration reference value an0=1.0, and the constant k=9, and the line in the map represents an equal risk potential line where the risk potential RP is equal.

In FIG. 8 and FIG. 10, it is shown that the risk potential RP becomes is larger as the reciprocal TTCi of the time to contact, and also as the time headway THW becomes smaller, i.e. towards the upper left region of the map. On the other hand, in FIG. 9 and FIG. 11, the variable α calculated from the necessary deceleration an approaches zero as the reciprocal TTCi of the time to contact and the time headway THW increase, which indicates the approach of a completely transient state. When the reciprocal TTCi of the time to contact is zero in a completely steady state, the variable α=1. As shown in FIG. 9 and FIG. 11, at the vehicle speed v1=40 km/h, the variable α is large compared with the vehicle speed v1=100 km/h under the same conditions, and thus the weighting for the steady term RPsteady of the risk potential RP is large.

In this way, as a result of changes in the variable α, the weighting between the steady term RPsteady and transient term RPtransient of the risk potential RP changes. Namely, the risk potential RP is calculated by adjusting the proportion between the steady term RPsteady and the transient term RPtransient according to whether the traveling state of the subject vehicle is a steady state or a transient state.

In the first embodiment described above, the following operational effects can be achieved.

(1) The controller 50 calculates the steady term RPsteady (a first risk potential) corresponding to risk perceived by the driver when the driving conditions of the subject vehicle is a steady state, and the transient term RPtransient (a second risk potential) corresponding to risk perceived by the driver when the driving conditions of the subject vehicle is a transient state. The steady term RPsteady and transient term RPtransient are weighted by using a first coefficient wa and a second coefficient wb, respectively. In other words, the first coefficient wa and the second coefficient wb are applied to the RPsteady and the RPtransient in order to weight the RP steady and the RP transient, respectively. The risk potential RP for the vehicle surroundings are then calculated by adding the weighted steady term RPsteady and the weighted transient term RPtransient. In this way, risk actually felt by the driver in the steady state and risk actually felt by the driver in the transient state are separately defined and used to calculate the risk potential RP. The risk potential RP sensed by the driver can then be calculated according to actual traveling conditions for the vehicle surroundings.

(2) The first coefficient wa for multiplying the steady term RPsteady is smaller than the second coefficient wb for multiplying the transient term RPtransient, and the weighting of the transient term RPtransient occurring at the risk potential RP is large compared to the steady term RPsteady. The calculated risk potential RP can be said to be latent because the traveling state of the vehicle surroundings do not change in a completely steady state. On the other hand, the calculated risk potential RP can be said to be already elicited because the traveling state of the vehicle surroundings change continuously in a completely transient state. It is therefore possible to express elicited risk as the risk potential RP by making the weighting of the transient term RPtransient large.

(3) The first coefficient wa is set to α/k and the second coefficient wb is set to (1−α/k) so that the first coefficient wa and the second coefficient wb are set at an internal division ratio α/k:(1−α/k). In other words, an internal division ratio α/k:(1−α/k) is taken for a ratio between the first coefficient wa and the second coefficient wb. As a result, a balance is achieved for the steady term RPsteady and the transient term RPtransient for the risk potential RP, and thus the risk potential RP can be accurately calculated.

(4) The controller 50 calculates the first coefficient wa and the second coefficient wb using the variable α. The variable α is a weighting variable for providing appropriate weightings to the steady term RPsteady and the transient term RPtransient, and is set based on the vehicle state of the subject vehicle and the traveling environment of the vehicle surroundings. As a result, it is possible to define the risk potential RP in line with risk actually felt by a driver by changing the weightings of the steady term RPsteady and transient term RPtransient according to the travel conditions of the vehicle surroundings.

(5) First, in order to calculate the weighting variable α, the controller 50 first calculates the necessary deceleration an required to avoid coming into contact with the preceding vehicle for the current travel conditions of the subject vehicle. The variable α is calculated from (Equation 4) using the necessary deceleration an. Since the variable a are set according to approaching condition for between the subject vehicle and the preceding vehicle, the weightings of the steady term RPsteady and the transient term RPtransient changes, and therefore the risk potential RP in line with risk actually felt by the driver can be calculated. In particular, in the state where the steady state and the transient state coexist (0<α<1), subjective risk for the driver can be accurately expressed as the risk potential RP.

(6) The controller 50 then calculates the time headway THW between the subject vehicle and the preceding vehicle from (Equation 2) using the subject vehicle speed v1 and inter-vehicle distance d, and uses the reciprocal of the time headway 1/THW as the steady term RPsteady. In this way, the risk actually felt by the driver can be appropriately expressed in the case where the driving conditions of the subject vehicle are the steady state.

(7) The controller 50 then calculates the time to contact TTC between the subject vehicle and the preceding vehicle from (Equation 1) using the relative velocity vr and inter-vehicle distance d, and uses the reciprocal 1/TTC of the time to contact as the transient term RPtransient. In this way, the risk actually felt by the driver can be appropriately expressed in the case where the driving conditions of the subject vehicle are the transient state.

(8) The controller 50 calculates the AF increase amount ΔF according to the calculated risk potential RP and controls operation reaction force F caused to be generated at the acceleration pedal 80. In this way, the risk potential RP of the vehicle surroundings can be reliably transmitted to the driver as the reaction force F of the accelerator pedal 80 constituting a vehicle operation equipment.

Second Embodiment

The following is a description of a vehicle driving assist system of a second embodiment of the present invention. The configuration for the vehicle driving assist system of the second embodiment is the same as for the first embodiment shown in FIG. 1 and FIG. 2. Description here will mainly focus on points of difference from the first embodiment.

In the second embodiment, the variable α for deciding weightings of the steady state and transient state for the traveling state for the current vehicle surroundings is calculated based on the relative velocity vr between the subject vehicle and the preceding vehicle. The variable α is calculated from (Equation 5) using the relative velocity vr.

$$\alpha = 1 - vr/vr_0 \quad \text{(Equation 5)}$$

where $0 \leq \alpha \leq 1$. $vr_0$ is a predetermined relative velocity taken as a reference, and is set appropriately in advance from results of tests, etc.

Figure 12:
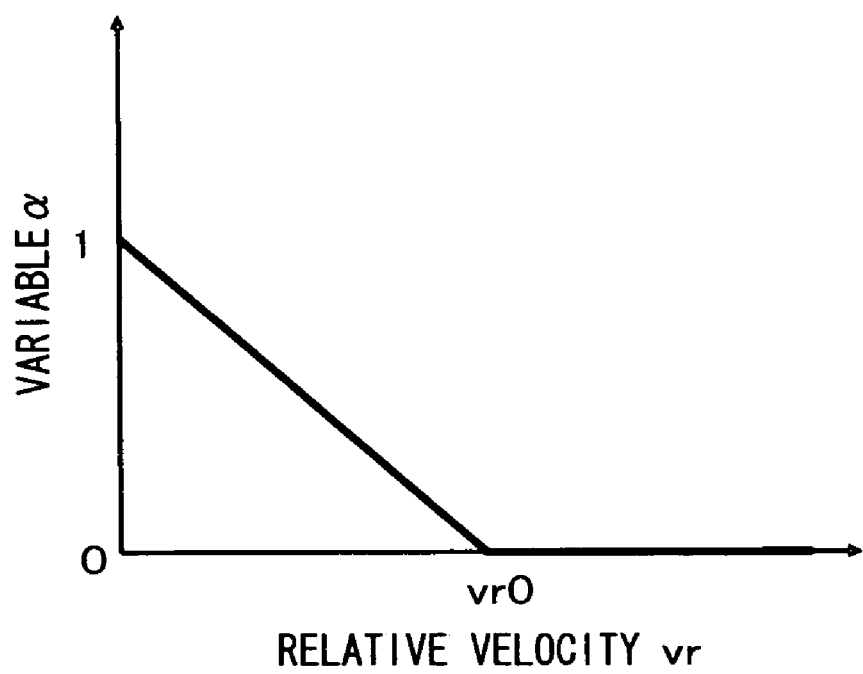
FIG. 12 is a view showing the relationship between a relative velocity and a variable α.

The relationship between the relative velocity vr and the variable α is shown in FIG. 12. As shown in FIG. 12, when the relative velocity vr is vr=0, there is a completely steady state of the variable a=1, and when the relative velocity vr becomes faster, the variable αfalls, and a state where a steady state and a transient state exist is attained. When the relative velocity becomes $vr \geq vr_0$, then a completely transient state where α=0 is attained.

The risk potential RP for the vehicle surroundings is calculated using (Equation 3) described above using the variable α calculated based on current relative velocity vr between the subject vehicle and the preceding vehicle. When the variable α approaches 1 so that a completely steady state is approached, the proportion of steady term RPsteady in the risk potential RP is large, and conversely, when the variable a approaches zero so that a completely transient state is approached, the proportion of the transient term RPtransient occurring in the risk potential RP is large. A relative velocity reference value vr0 and constant k are set to, for example, vr0=20, k=8.

Figure 13:
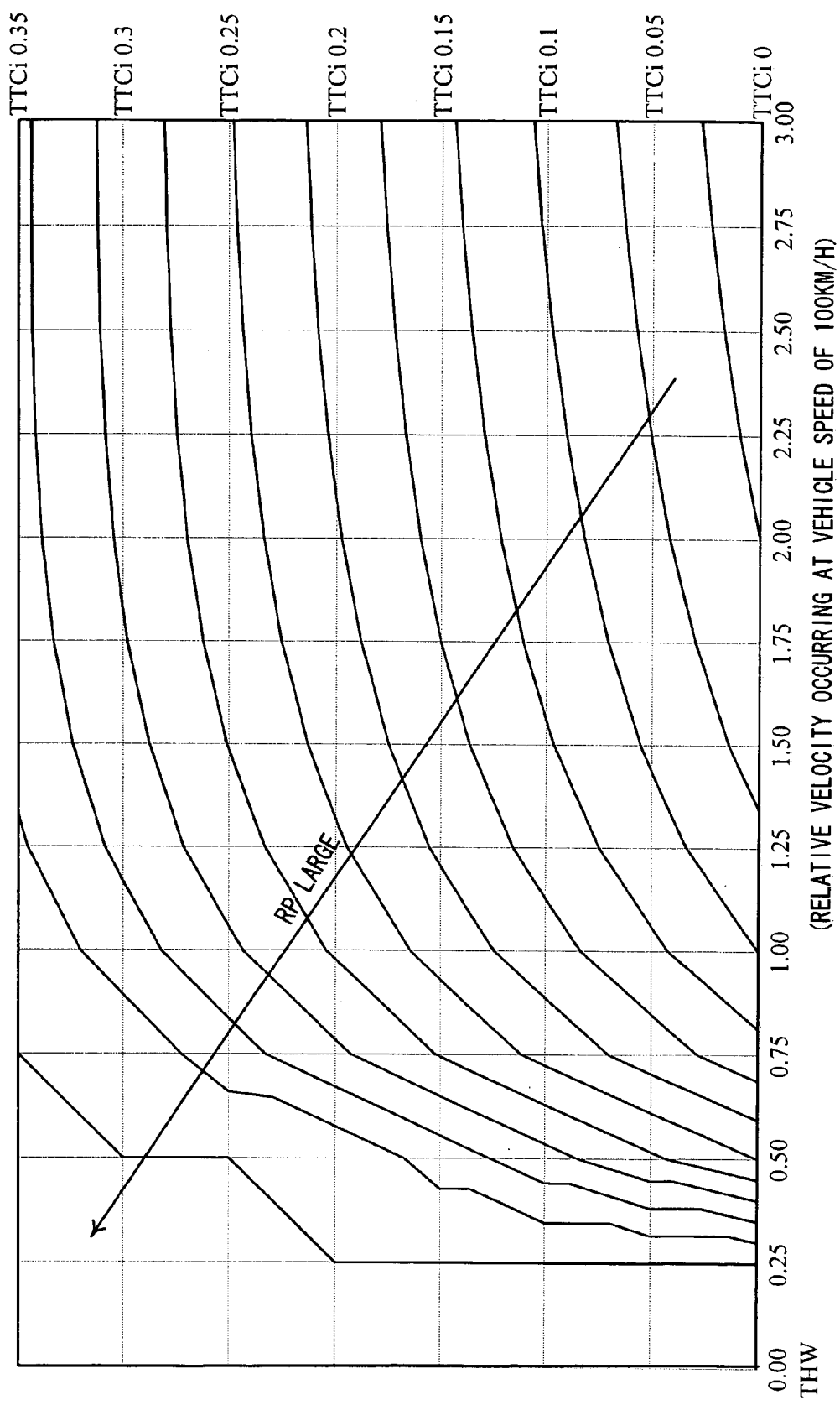
FIG. 13 is a view showing characteristics of a risk potential with respect to a reciprocal of time to contact and a time headway for the case of calculating the variable a from the relative velocity.
Figure 14:
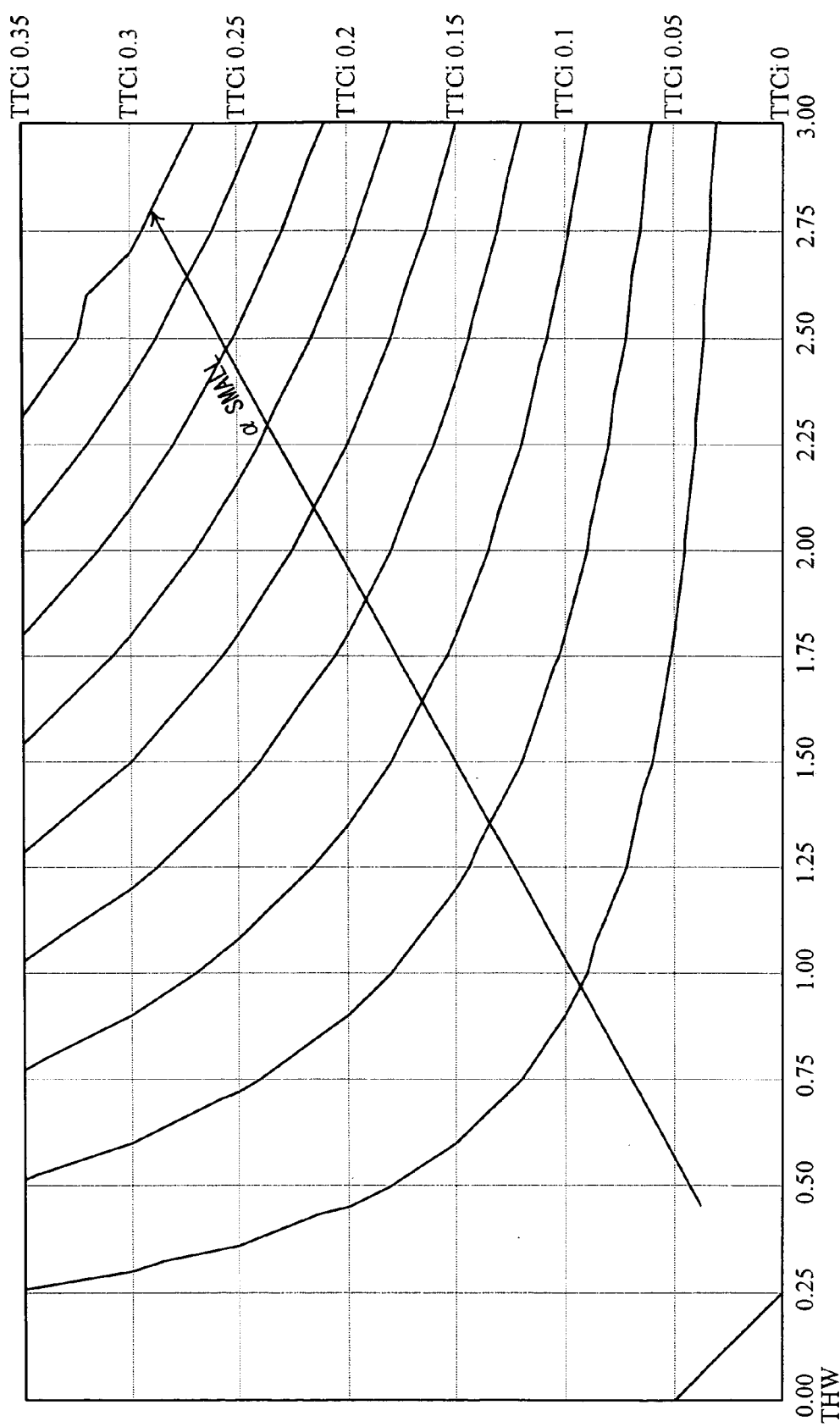
FIG. 14 is a view showing change in the variable a corresponding to FIG. 13.
Figure 15:
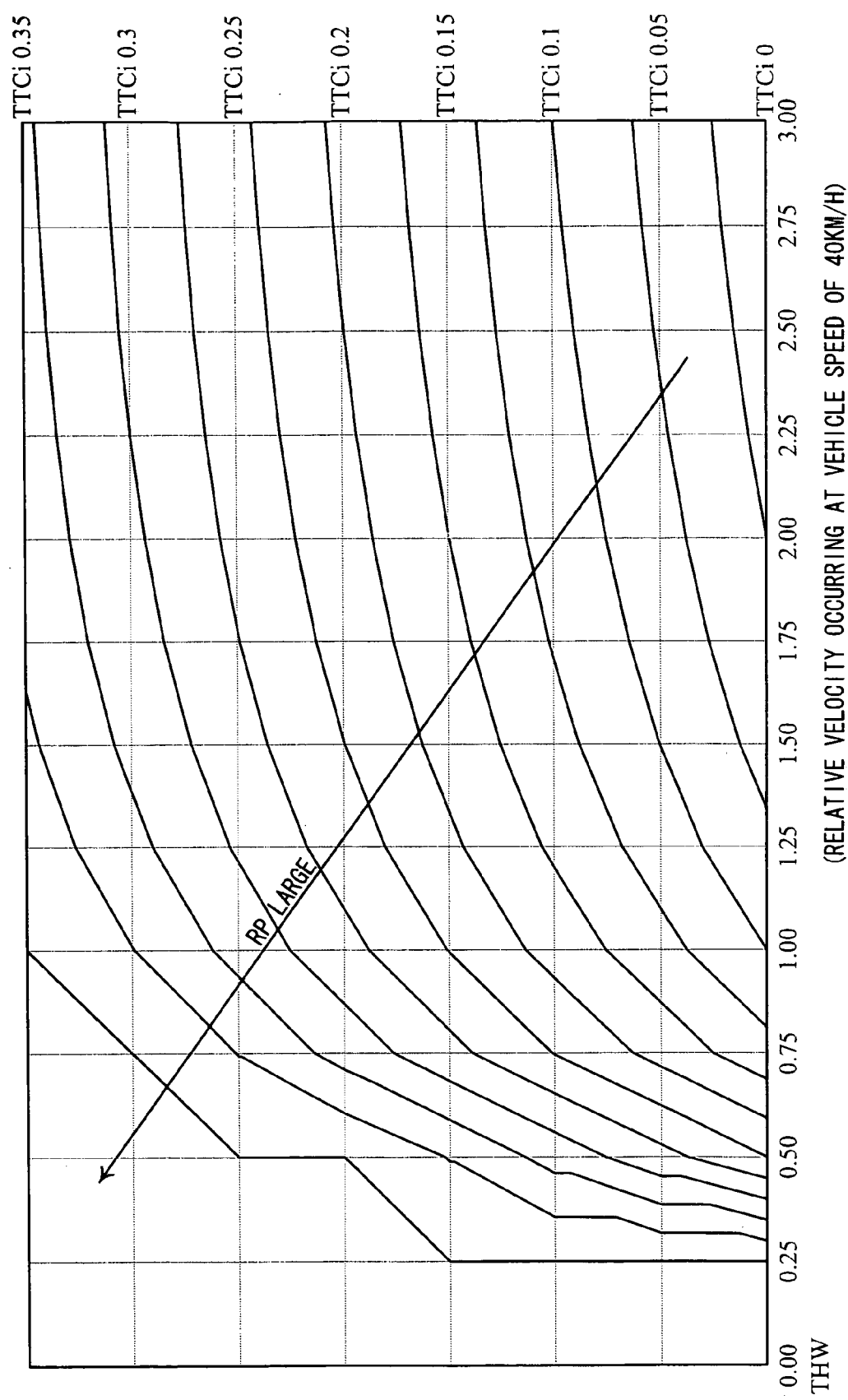
FIG. 15 is another view showing characteristics of a risk potential with respect to a reciprocal of time to contact and a time headway for the case of calculating the variable a from the relative velocity.
Figure 16:
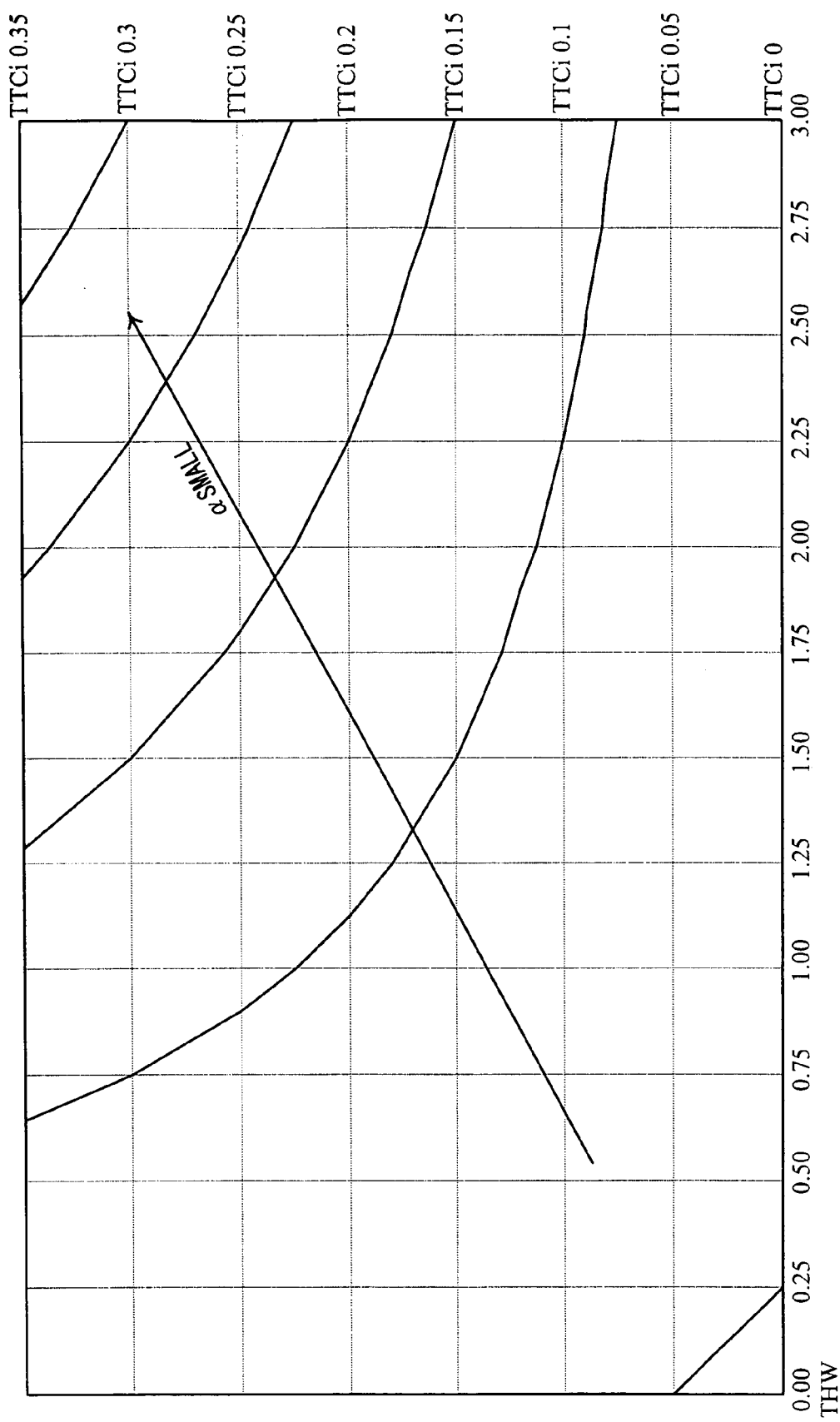
FIG. 16 is a view showing change in the variable a corresponding to FIG. 15.

A risk potential map of the case where the variable α is set using the relative velocity vr occurring at the vehicle speed v1=100 km/h is shown in FIG. 13, and change in the variable α corresponding to the risk potential map of FIG. 13 is shown in FIG. 14. In FIG. 13 and FIG. 14, the vertical axis shows the reciprocal TTCi of the time to contact and the horizontal axis shows the time headway THW. Similarly, a risk potential map of the case where the variable α is set using the relative velocity vr occurring at the vehicle speed v1=40 km/h is shown in FIG. 15, and change in the variable α corresponding to the risk potential map of FIG. 15 is shown in FIG. 16. In FIG. 13 and FIG. 15, the relative velocity reference value vr0=20, and constant k=8, and the line in the map is an equal risk potential line where the risk potential RP is equal.

In FIG. 13 and FIG. 15, it is shown that risk potential RP is large as the reciprocal TTCi of the time to contact becomes large, and also as the time headway THW becomes smaller, i.e. as approaching the upper left region of the map. On the other hand, in FIG. 14 and FIG. 16, the variable a calculated from the relative velocity vr approaches zero as the reciprocal TTCi of the time to contact and the time headway THW increase, which indicates the approach of a completely transient state. When the reciprocal TTCi of the time to contact is zero in a completely steady state, the variable a=1. As shown in FIG. 14 and FIG. 16, at the vehicle speed v1=40 km/h, the variable α is large compared with the vehicle speed v1=100 km/h under the same conditions and thus, the weighting for the steady term RPsteady of the risk potential RP is large.

In this way, as a result of changes in the variable α, the weighting of steady term RPsteady and transient term RPtransient of the risk potential RP changes. Namely, the risk potential RP is calculated by adjusting the proportion of the steady term RPsteady and the transient term RPtransient according to whether the driving state of the subject vehicle is a steady state or a transient state.

In the second embodiment described above, the following operational effects can be achieved.

The controller 50 calculates the weighting variable a from (Equation 5) using the relative velocity vr between the subject vehicle and the preceding vehicle. As a result, the steady term RPsteady and transient term RPtransient can be weighted by settgn a variable a using a simple algorithm.

Third Embodiment

The following is a description of a vehicle driving assist system of a third embodiment of the present invention. The configuration for the vehicle driving assist system of the third embodiment is the same as for the first embodiment shown in FIG. 1 and FIG. 2. Description here will mainly focus on points of difference from the first embodiment.

In the third embodiment, the variable a for deciding weighting of the steady state and transient state for the traveling state for the current vehicle surroundings is calculated based on the reciprocal TTCi of the time to contact from the subject vehicle to the preceding vehicle. The variable α is calculated from (Equation 6) using the reciprocal TTCi of the time to contact.

$$\alpha = 1 - TTCi/TTCi0 \quad \text{(Equation 6)}$$

where $0 \leq \alpha \leq 1$. TTCi0 is a predetermined reciprocal of the time to contact taken as a reference, and is set appropriately in advance from results of tests, etc.

Figure 17:
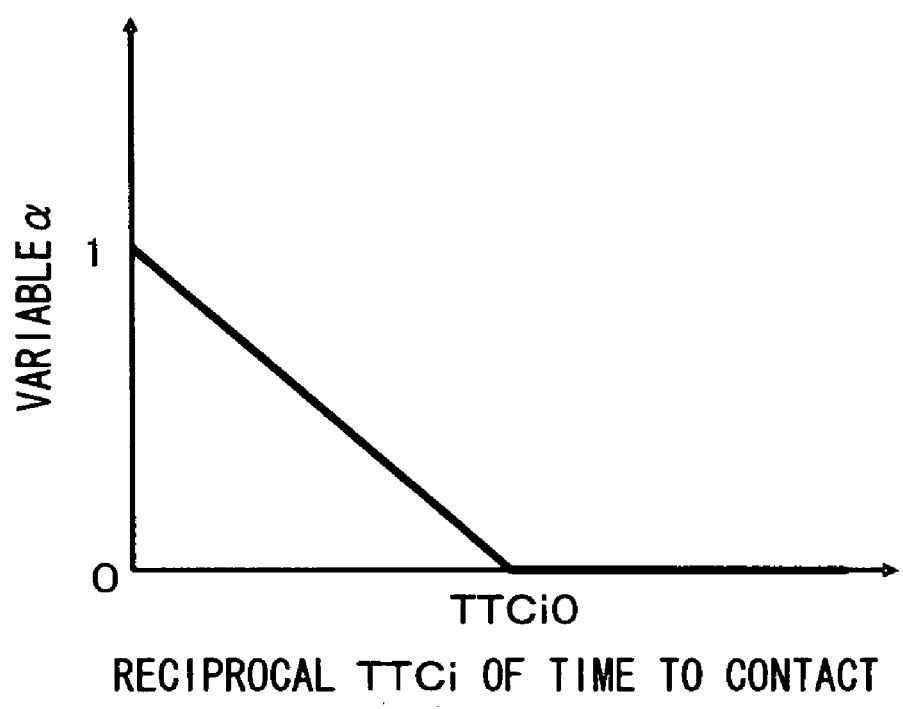
FIG. 17 is a view showing the relationship between the reciprocal of time to contact and the variable α.

The relationship between the reciprocal TTCi of time to contact and the variable α is shown in FIG. 17. As shown in FIG. 17, when the reciprocal TTCi of the time to contact=0, a completely steady state of variable α=1 is attained. When the reciprocal TTCi of the time to contact becomes large so that the degree of closeness of the subject vehicle and the preceding vehicle is large, the variable a falls, and a situation where the steady state and the transient state coexist arises. When the reciprocal TTCi of the time to contact $\geq$ TTCi0, then a completely transient state where α=0 is attained.

The risk potential RP for the vehicle surroundings is calculated using (Equation 3) described above using the variable α calculated based on reciprocal TTCi of the time to contact between the subject vehicle and the preceding vehicle. When the variable a approaches 1 so that a completely steady state is approached, the proportion of steady term RPsteady in the risk potential RP is large, and conversely, when the variable α approaches zero so that a completely transient state is approached, the proportion of the transient term RPtransient occurring in the risk potential RP is large. The reference value TTCi0 for the reciprocal of the time to contact and the constant k are set to be in the order of, for example, TTCi0=0.5, k=9.

Figure 18:
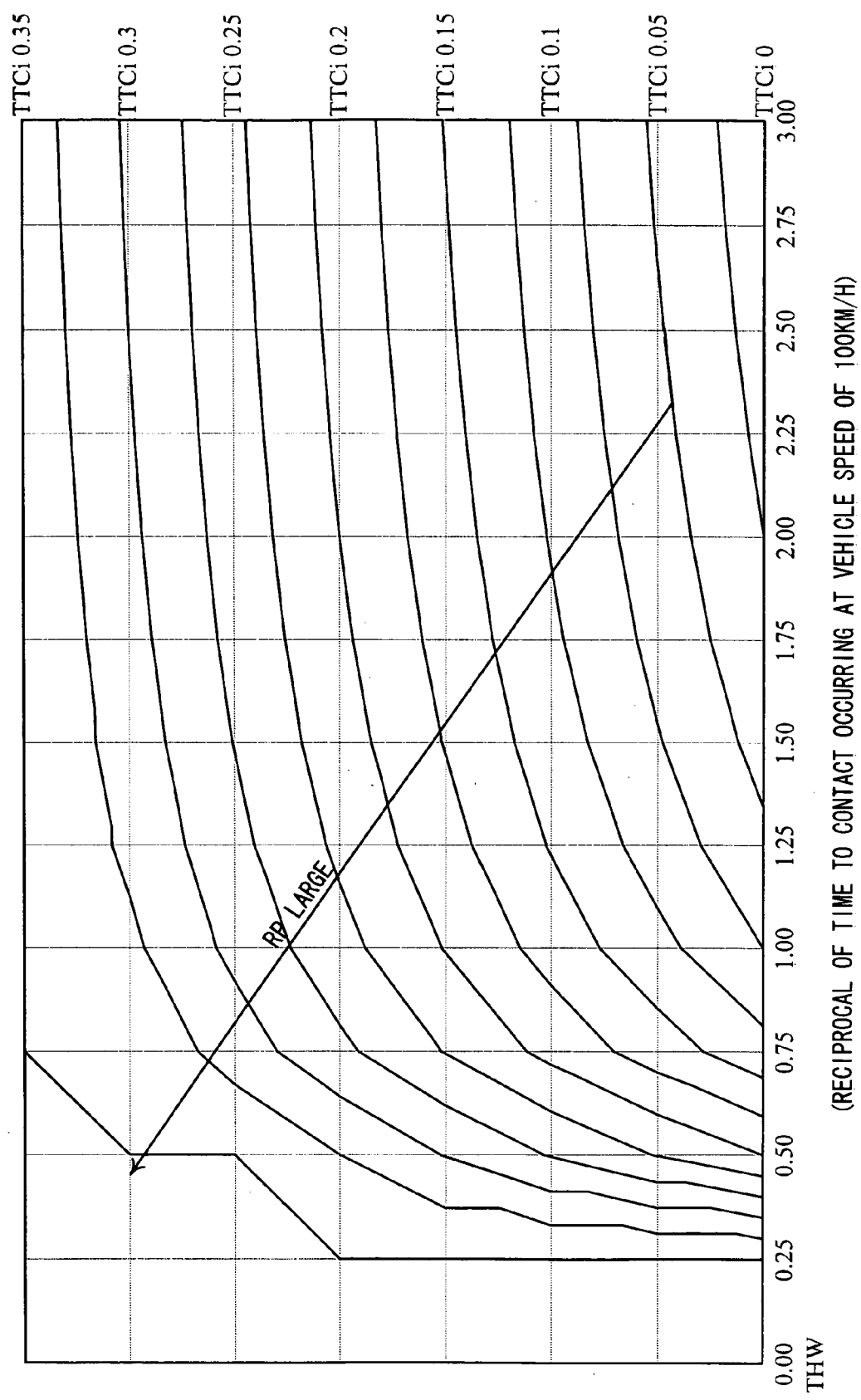
FIG. 18 is a view showing characteristics of a risk potential with respect to a reciprocal of time to contact and a time headway for the case of calculating the variable a from the reciprocal of time to contact.
Figure 19:
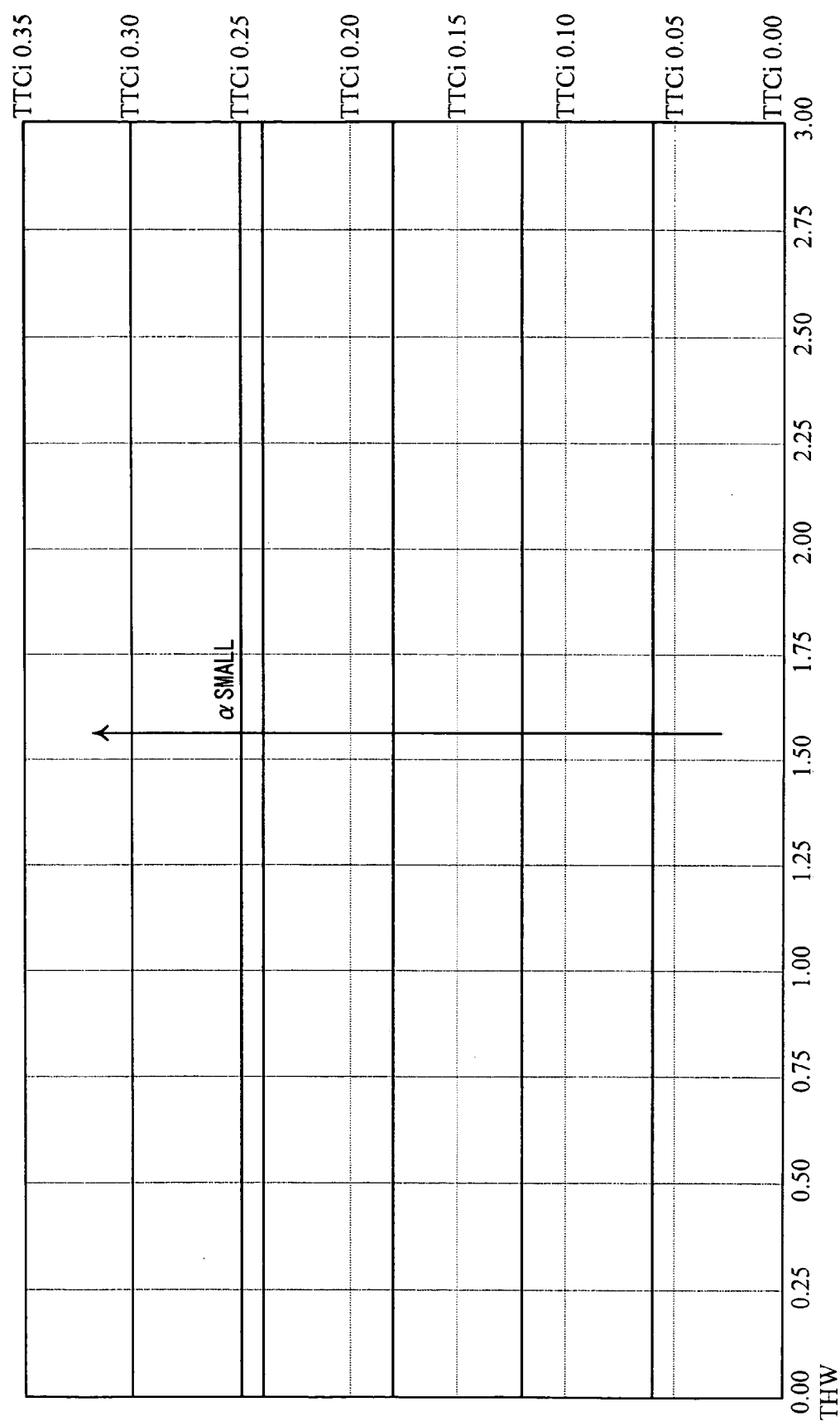
FIG. 19 is a view showing change in the variable α corresponding to FIG. 18.
Figure 20:
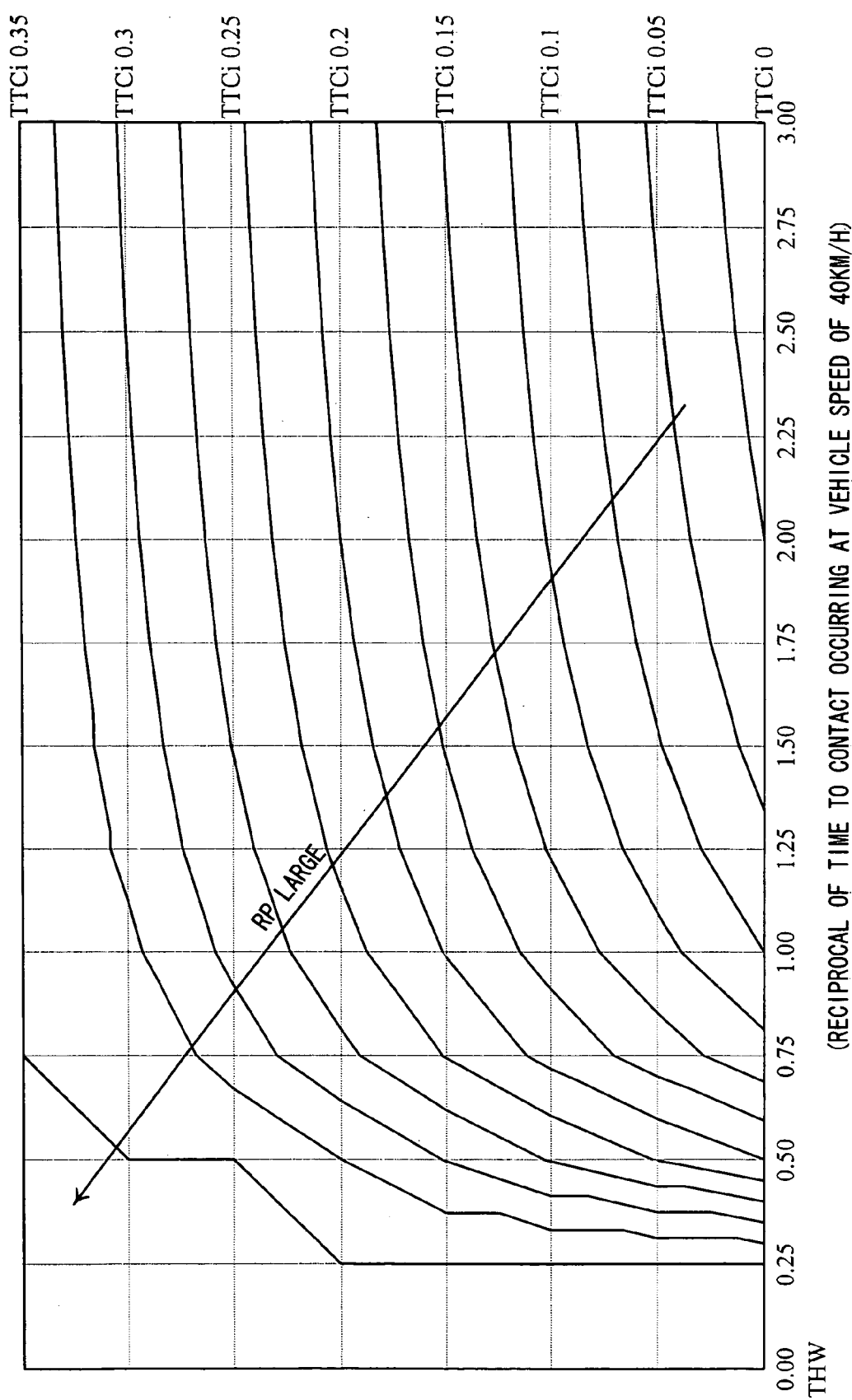
FIG. 20 is another view showing characteristics of a risk potential with respect to a reciprocal of time to contact and a time headway for the case of calculating the variable a from the reciprocal of time to contact.
Figure 21:
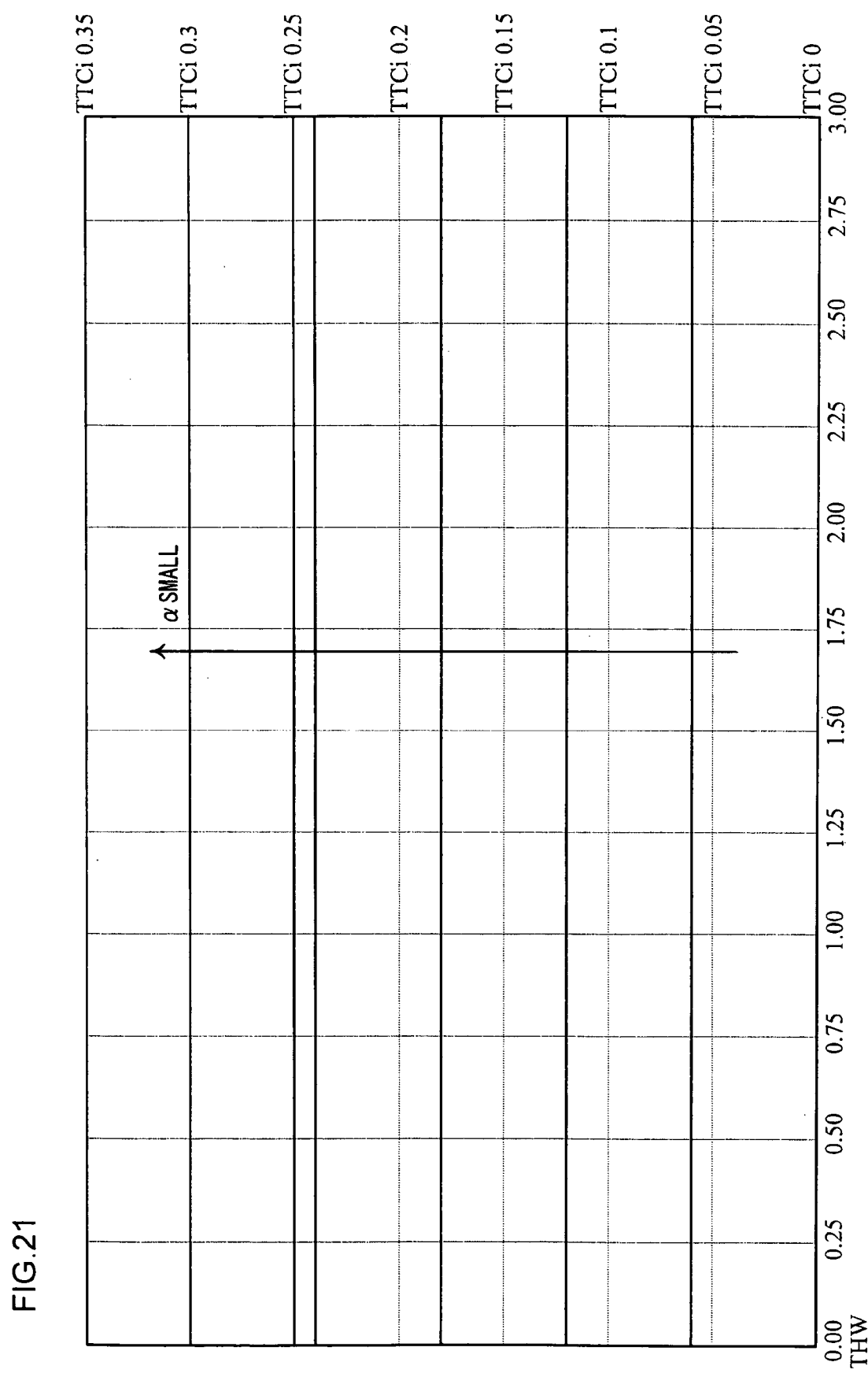
FIG. 21 is a view showing change in the variable α corresponding to FIG. 20.

The risk potential maps for the cases of setting the variable α using the reciprocal TTCi of the time to contact occurring at vehicle speeds of v1=100 km/h and vehicle speed v1=40 km/h are shown in FIG. 18 and FIG. 20, and changes in variable a corresponding to the risk potential map of FIG. 18 and FIG. 20 are shown in FIG. 19 and FIG. 21, respectively. In FIG. 18 to FIG. 21, the vertical axis shows the reciprocal TTCi of the time to contact and the horizontal axis shows the time headway THW. In FIG. 18 and FIG. 20, a reference value for the time to contact reciprocal TTCi0=0.5, and the constant k=9, and the line in the map is an equal risk potential line where the risk potential RP is equal.

In FIG. 18 and FIG. 20, it is shown that the risk potential RP is large as the reciprocal TTCi of the time to contact becomes large, and as the time head way THW becomes smaller, i.e. towards the upper left region of the map. On the other hand, in FIG. 19 and FIG. 21, the variable α approaches zero as the reciprocal TTCi of the time to contact increases, which indicates the approach of a completely transient state. When the reciprocal TTCi of the time to contact is zero, the variable α=1. Since the reciprocal TTCi of the time to contact is not influenced by changes in the vehicle speed v1, graphs in FIG. 19 and FIG. 21 showing the variable a based on the reciprocal TTCi of the time to contact become identical to each other. Therefore, graphs of FIG. 18 and FIG. 20 also become identical to each other.

In this way, as a result of changes in the variable α, the weighting of steady term RPsteady and transient term RPtransient of the risk potential RP changes. Namely, the risk potential RP is calculated by adjusting the proportion between the steady term RPsteady and the transient term RPtransient according to whether the traveling state of the subject vehicle is a steady state or a transient state.

In the third embodiment described above, the following operational effects can be achieved.

The controller 50 calculates the time to contact TTC between the subject vehicle and the preceding vehicle from the inter-vehicle distance d and the relative velocity vr, and calculates the weighting variable α from the (Equation 6) using the reciprocal 1/TTC of the time to contact. By setting the variable a based on the reciprocal 1/TTC of the time to contact expressing the degree of closeness of the subject vehicle to the preceding vehicle, the weightings for steady term RPsteady and transient term RPtransient are changed according to the approaching condition for the subject vehicle and the preceding vehicle. The risk potential RP can then be calculated according to subjective risk of the driver.

Fourth Embodiment

The following is a description of a vehicle driving assist system of a fourth embodiment of the present invention. The configuration for the vehicle driving assist system of the fourth embodiment is the same as for the first embodiment shown in FIG. 1 and FIG. 2. In the fourth embodiment, the method for calculating the steady term RPsteady for the risk potential RP is different from the first embodiment described above. Description here will mainly focus on points of difference from the first embodiment.

In the first embodiment described above, a reciprocal 1/THW of the time headway is used as the steady term RPsteady for the risk potential. Here, considering a time headway THW=one second, when the vehicle speed v1 is 30 km/h, the inter-vehicle distance d=8.3 m. On the other hand, in the case of a vehicle speed v1 of 100 km/h, the time headway THW becomes 1 second at the inter-vehicle distance d=27.8 m. Even when the time headway THW is the same, it is considered that a substantial risk is felt by the driver when the vehicle speed is fast. Furthermore, when the vehicle speed v1 is slow, the driver generally tries to maintain the inter-vehicle distance d. Accordingly, there is a tendency to increase the time headway THW as the vehicle speed v1 becomes slower. Namely, there are cases where the actual risk felt by a driver is different even when the reciprocal 1/THW of the time headway calculated as the steady term RPsteady of the risk potential RP is the same.

Figure 22:
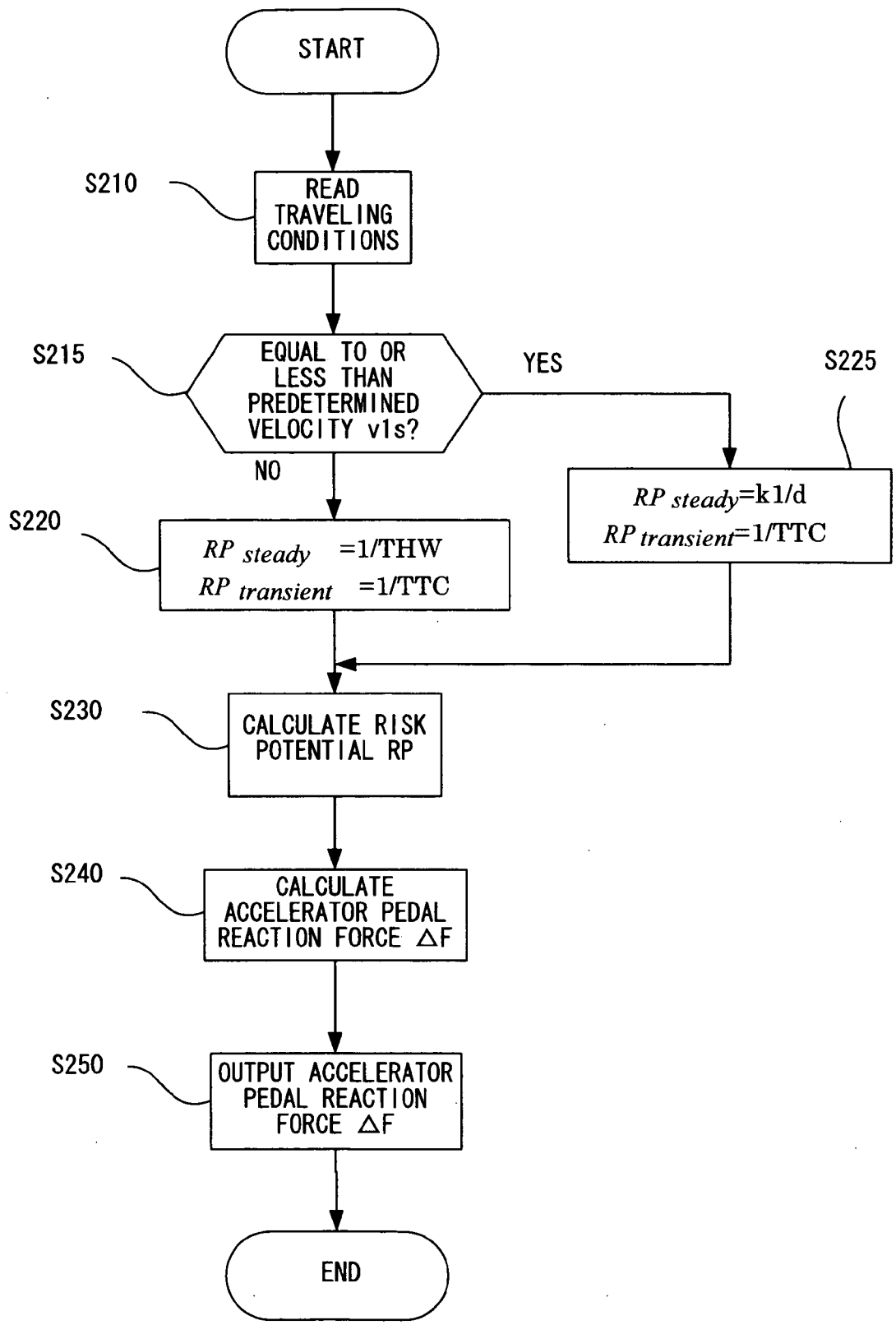
FIG. 22 is a flow chart showing a processing sequence for a drive operation assist control program of a controller of a fourth embodiment.

In the fourth embodiment, the method for calculating the steady term RPsteady of the risk potential RP is switched over according to the vehicle speed v1. In the following, a method of calculating the risk potential RP in the fourth embodiment will be described using the flowchart of FIG. 22. FIG. 22 is a flowchart showing a processing sequence for a drive operation assist control program implemented in the controller 50 and the content of this processing is carried out successively at fixed intervals (for example, every 50 msecs).

In step S210, running conditions of the subject vehicle and the vehicle surroundings are read in from the laser radar 10 and the vehicle speed sensor 20. Specifically, parameters indicating the driving conditions of the subject vehicle and preceding vehicle shown in FIG. 5 are read in.

In step S215, a determination is made as to whether or not the subject vehicle speed v1 is less than a predetermined vehicle speed v1s based on traveling state data read in step S210. When the vehicle speed v1 exceeds a predetermined velocity v1s and a negative judgment is made in step S215, step S220 is proceeded to. In step S220, as with the first embodiment described above, a reciprocal 1/THW for the time headway is calculated as the steady term RPsteady of the risk potential RP, and the reciprocal 1/TTC of the time to contact is calculated as the transient term RPtransient.

On the other hand, when the vehicle speed v1 is equal to or less than the predetermined velocity v1s and an affirmative judgment is made in step S215, step S225 is proceeded to. In step S225, the steady term RPsteady for the risk potential RP is calculated from the following (Equation 7).

$$RPsteady = k1/d \qquad \text{(Equation 7)}$$

Here, d is the inter-vehicle distance between the subject vehicle and the preceding vehicle, and k1 is a constant set in advance. For the transient term RPtransient of the risk potential RP, the reciprocal 1/TTC for the time to contact is used.

Next, in step S230, the risk potential RP is calculated from (Equation 3) described above using the steady term RPsteady and the transient term RPtransient calculated in step S220 or step S225. The variable α is calculated from, for example, the necessary deceleration an described above.

The processing occurring in step S240 and step S250 is the same as the steps S140 and S150 of the first embodiment shown in FIG. 4.

In the fourth embodiment described above, the following operational effects can be achieved.

When the vehicle speed v1 is equal to or less than the predetermined value v1s, the reciprocal of the inter-vehicle distance d is used as the steady term RPsteady, and when the vehicle speed v1 exceeds the predetermined value v1s, the reciprocal 1/THW of the time headway is used as the steady term RPsteady. When the subject vehicle speed v1 is slow, the driver has a tendency to maintain the inter-vehicle distance d to the preceding vehicle rather than maintain the time headway THW. And thus, it is possible to calculate risk potential RP in line with that actually felt by the driver using the reciprocal of the inter-vehicle distance d as the steady term RPsteady.

The steady term RPsteady may be calculated from the reciprocal of the inter-vehicle distance d regardless of the magnitude of the subject vehicle speed v1. In this way, it is possible to calculate the steady term RPsteady using a simple formula. However, by switching over the equation for the steady term RPsteady according to the vehicle speed v1, it is possible to accurately calculate the steady term RPsteady in line with risk actually felt by the driver for when the vehicle speed v1 is either fast or slow.

Fifth Embodiment

The following is a description of a vehicle driving assist system of a fifth embodiment of the present invention. The configuration for the vehicle driving assist system of the fifth embodiment is the same as for the first embodiment shown in FIG. 1 and FIG. 2. In the fifth embodiment, the method for calculating the transient term RPtransient for the risk potential RP is different from the first embodiment described above. Description here will mainly focus on points of difference from the first embodiment.

In the first embodiment described above, a reciprocal 1/TTC of the time to contact is used as the transient term RPtransient for the risk potential RP. When the time to contact TTC=8 seconds is considered, the relative velocity vr between the subject vehicle and the preceding vehicle is 5 km/h at the inter-vehicle distance d=8.3 m. On the other hand, in the case of a relative velocity vr of 12.5 km/h, at the inter-vehicle distance d=27.8 m, the time to contact TTC=8 seconds. When the time to contact TTC is the same, it is considered that a substantial risk is felt by the driver when the inter-vehicle distance d is short. Namely, there are cases where the actual risk felt by a driver is different even when the reciprocal 1/TTC of the time to contact calculated as the transient term RPtransient of the risk potential RP is the same.

Figure 23:
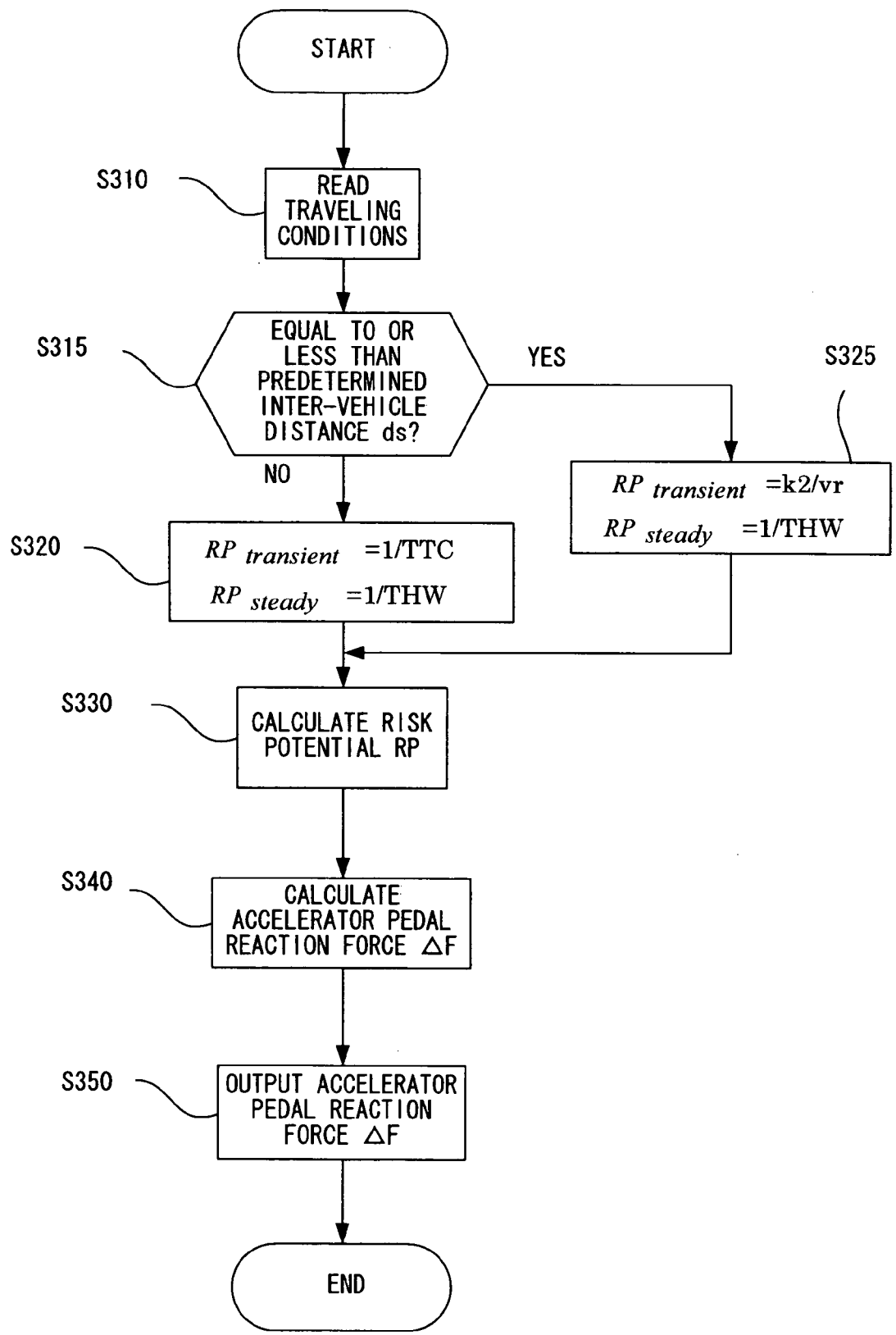
FIG. 23 is a flow chart showing a processing sequence for a drive operation assist control program of a controller of a fifth embodiment.

In the fifth embodiment, the method for calculating the transient term RP transient of the risk potential RP is switched over according to the inter-vehicle distance d. In the following, a method of calculating risk potential RP in the fifth embodiment will be described using the flowchart of FIG. 23. FIG. 23 is a flowchart showing a processing sequence for a drive operation assist control program implemented in the controller 50. The content of this processing is carried out successively at fixed intervals (for example, every 50 msecs)

In step S310, running conditions of the subject vehicle and the vehicle surroundings are read in from the laser radar 10 and the vehicle speed sensor 20. Specifically, parameters indicating the traveling state of the subject vehicle and preceding vehicle shown in FIG. 5 are read in.

In step S315, a determination is made as to whether or not the inter-vehicle distance d between the subject vehicle and the preceding vehicle is equal to or less than a predetermined value ds based on driving condition data read in in step S310. When the inter-vehicle distance d exceeds a predetermined inter-vehicle distance d and a negative judgment is made in step S315, step S320 is proceeded to. In step S320, as with the first embodiment described above, a reciprocal 1/THW for the time headway is calculated as the steady term RPsteady of the risk potential RP, and the reciprocal 1/TTC of the time to contact is calculated as the transient term RPtransient.

On the other hand, when the inter-vehicle distance d is equal to or less than the predetermined value ds and an affirmative judgment is made in step S315, step S325 is proceeded to. In step S325, the transient term RPtransient for the risk potential RP is calculated from the following (Equation 8).

$$RPtransient = k2/vr \qquad \text{(Equation 8)}$$

Here, vr is the relative velocity between the subject vehicle and the preceding vehicle, and k2 is a constant set in advance. For the steady term RPsteady of the risk potential RP, the reciprocal 1/THW of the time headway is used.

Next, in step S330, the risk potential RP is calculated from (Equation 3) described above using the steady term RPsteady and the transient term RPtransient calculated in step S320 or step S325. The variable α is calculated from, for example, the necessary deceleration an described above.

The processing occurring in step S340 and step S350 is the same as the steps S140 and S150 of the first embodiment shown in FIG. 4.

In the fifth embodiment described above, the following operational effects can be achieved.

When the inter-vehicle distance d is equal to or less than the predetermined value ds, the reciprocal of the relative velocity vr is used as the transient term RPtransient, and when the inter-vehicle distance d exceeds the predetermined value ds, the reciprocal 1/TTC of the time to contact is used as the transient term RPtransient. When the inter-vehicle distance d is short, the risk potential RP can be calculated in line with risk actually felt by the driver by using the reciprocal of the relative velocity vr as the transient term RPtransient.

The transient term RPtransient may be calculated from the reciprocal of the relative velocity vr regardless of the inter-vehicle distance d. In this way, it is possible to calculate the transient term RPtransient using a simple formula. However, by switching over the equation for the transient term RPtransient according to the inter-vehicle distance d, it is possible to accurately calculate the transient term RPtransient in line with risk actually felt by the driver for when the inter-vehicle distance d is either large or small.

By combining the fourth embodiment and the fifth embodiment, it is possible to switch over the equation for the transient term RPtransient of the risk potential RP according to the inter-vehicle distance d and also to switch over the equation for the steady term RPsteady according to the vehicle speed v1. The variable α for deciding the weighting of the transient term RPtransient and steady term RPsteady can be set using any of the methods described for the first embodiment to the third embodiment.

In the first embodiment described above, a description is given of setting the necessary deceleration reference value $an_0=1.0$, and setting the constant $k=9$, but the present invention is by no means limited in this respect, and other values that appropriately set the variable α and the coefficients wa and wb may also be employed. The values used in the second embodiment where the relative velocity reference value $vr_0=20$ and the constant $k=8$, and the values used in the third embodiment where the reference value for time to contact reciprocal $TTCi_0=0.5$ and the constant $k=9$ are by no means limited to these values.

In the first to fifth embodiments, the AF increase amount ΔF is set proportionally with respect to the risk potential RP but the present invention is by no means limited in this respect. The AF increase amount ΔF may also, for example, increase as an exponential function with respect to increase in the risk potential RP.

In the first to fifth embodiments, it is also possible to use milliwave radar etc. of another method in place of the laser radar 10, or to use a CCD camera or CMOS camera in order to detect conditions in the vehicle surroundings. Further, it is also possible to provide a brake pedal reaction force control device so that it is possible to generate operation reaction force at the brake pedal according to the risk potential RP. Moreover, in the first to fifth embodiments, the steady term RPsteady and the transient term RPtransient are multiplied by the first coefficient wa and the second coefficient wb respectively, but the present invention is not limited in this respect. the first coefficient wa and the second coefficient may simply be added to the RPsteady and the RPtransient, respectively.

The above-described embodiments are examples, and various modifications can be made without departing from the spirit and scope of the invention.

The disclosure of the following priority application is herein incorporated by reference:

Japanese Patent Application No. 2003-159297 filed Jun. 4, 2003

What is claimed is:

1. A risk potential calculating device for a vehicle, comprising:
   a state recognition device that detects vehicle conditions of a subject vehicle and a traveling environment for vehicle surroundings; and
   a risk potential calculator that calculates a risk potential for the vehicle surroundings based on detection results of the state recognition device, wherein
   the risk potential calculator calculates the risk potential by respectively calculating a first risk potential expressing a risk in a case where driving conditions of the subject vehicle are in a steady state and a second risk potential expressing a risk for a case where the driving conditions of the subject vehicle are in a transient state, and adding the first risk potential weighted by a first coefficient and the second risk potential weighted by a second coefficient.

2. A risk potential calculating device for a vehicle according to claim 1, wherein
   the risk potential calculator calculates the risk potential by adding a product of the first risk potential and the first coefficient and a product of the second risk potential and the second coefficient.

3. A risk potential calculating device for a vehicle according to claim 1, wherein
   the first coefficient is smaller than the second coefficient.

4. A risk potential calculating device for a vehicle according to claim 1, wherein
   the risk potential calculator sets the first coefficient and the second coefficient in such a manner that an internal division ratio is taken for a ratio between the first coefficient and the second coefficient.

5. A risk potential calculating device for a vehicle according to claim 1, wherein
   the risk potential calculator calculates a weighting variable for applying weightings to the first risk potential and the second risk potential respectively based on the detection results of the state recognition device, and then sets the first coefficient and the second coefficient using the weighting variable.

6. A risk potential calculating device for a vehicle according to claim 5, wherein
   the risk potential calculator calculates a necessary deceleration required in order to avoid making contact with a preceding vehicle at current driving conditions for the subject vehicle based on the detection results of the state recognition device, and sets the weighting variable based on the necessary deceleration thus calculated.

7. A risk potential calculating device for a vehicle according to claim 5, wherein
   the risk potential calculator sets the weighting variable based on a relative velocity between the subject vehicle and a preceding vehicle detected by the state recognition device.

8. A risk potential calculating device for a vehicle according to claim 5, wherein
   the risk potential calculator calculates a time to contact representing a degree of closeness of the subject vehicle to a preceding vehicle based on the detection results of the state recognition device and sets the weighting variable based on a reciprocal of the time to contact.

9. A risk potential calculating device for a vehicle according to claim 1, wherein:
   the state recognition device detects a vehicle speed of the subject vehicle and an inter-vehicle distance between the subject vehicle and a preceding vehicle; and
   the risk potential calculator calculates a time headway between the subject vehicle and the preceding vehicle from the vehicle speed and the inter-vehicle distance detected by the state recognition device and uses a reciprocal of the time headway as the first risk potential.

10. A risk potential calculating device for a vehicle according to claim 1, wherein:
    the state recognition device detects an inter-vehicle distance for the subject vehicle and a preceding vehicle; and
    the risk potential calculator uses a reciprocal of the inter-vehicle distance detected by the state recognition device as the first risk potential.

11. A risk potential calculating device for a vehicle according to claim 1, wherein:

the state recognition device detects a vehicle speed of the subject vehicle and an inter-vehicle distance between the subject vehicle and a preceding vehicle; and the risk potential calculator uses a reciprocal of the inter-vehicle distance as the first risk potential when the vehicle speed detected by the state recognition device is equal to or less than a predetermined value, and uses a reciprocal of a time headway between the subject vehicle and the preceding vehicle calculated from the vehicle speed and the inter-vehicle distance as the first risk potential when the vehicle speed exceeds the predetermined value.

12. A risk potential calculating device for a vehicle according to claim 1, wherein:

the state recognition device detects an inter-vehicle distance and a relative velocity between the subject vehicle and a preceding vehicle; and the risk potential calculator calculates a time to contact between the subject vehicle and the preceding vehicle from the inter-vehicle distance and the relative velocity detected by the state recognition device and uses a reciprocal of the time to contact as the second risk potential.

13. A risk potential calculating device for a vehicle according to claim 1, wherein:

the state recognition device detects a relative velocity between the subject vehicle and a preceding vehicle; and the risk potential calculator uses a reciprocal of the relative velocity detected by the state recognition device as the second risk potential.

14. A risk potential calculating device for a vehicle according to claim 1, wherein:

the state recognition device detects an inter-vehicle distance and a relative velocity between the subject vehicle and a preceding vehicle; and the risk potential calculator uses a reciprocal of the relative velocity as the second risk potential when the inter-vehicle distance detected by the state recognition device is equal to or less than a predetermined value, and uses a reciprocal of a time to contact between the subject vehicle and the preceding vehicle calculated from the inter-vehicle distance and the relative velocity as the second risk potential when the vehicle speed exceeds the predetermined value.

15. A vehicle driving assist system, comprising:

a state recognition device that detects vehicle conditions of a subject vehicle and a traveling environment for vehicle surroundings;

a risk potential calculator that calculates a risk potential for the vehicle surroundings based on detection results of the state recognition device;

a reaction force calculating device that calculates an operation reaction force to be generated at a vehicle operation equipment according to the risk potential calculated by the risk potential calculator; and a reaction force generating device that generates the operation reaction force calculated by the reaction force calculating device at the vehicle operation equipment, wherein the risk potential calculator calculates the risk potential by respectively calculating a first risk potential expressing a risk in a case where driving conditions of the subject vehicle are in a steady state and a second risk potential expressing a risk for a case where the driving conditions of the subject vehicle are in a transient state, and adding the first risk potential weighted by a first coefficient and the second risk potential weighted by a second coefficient.

16. A vehicle, comprising:

a vehicle driving assist system that comprises (a) a state recognition device that detects vehicle conditions of a subject vehicle and a traveling environment for vehicle surroundings; (b) a risk potential calculator that calculates a risk potential for the vehicle surroundings based on detection results of the state recognition device; (c) a reaction force calculating device that calculates an operation reaction force to be generated at a vehicle operation equipment according to the risk potential calculated by the risk potential calculator; and (d) a reaction force generating device that generates the operation reaction force calculated by the reaction force calculating device at the vehicle operation equipment, wherein the risk potential calculator calculates the risk potential by respectively calculating a first risk potential expressing a risk in a case where driving conditions of the subject vehicle are in a steady state and a second risk potential expressing a risk for a case where the driving conditions of the subject vehicle are in a transient state, and adding the first risk potential weighted by a first coefficient and the second risk potential weighted by a second coefficient.

17. A risk potential calculating device for a vehicle, comprising:

a state recognition means for detecting vehicle conditions of a subject vehicle and a traveling environment for vehicle surroundings; and a risk potential calculating means for calculating a risk potential for the vehicle surroundings based on detection results of the state recognition means, wherein the risk potential calculating means calculates the risk potential by respectively calculating a first risk potential expressing risk in a case where driving conditions of the subject vehicle are in a steady state and a second risk potential expressing a risk for a case where driving conditions of the subject vehicle are in a transient state, and adding the first risk potential weighted by a first coefficient and the second risk potential weighted by a second coefficient.

18. A risk potential calculating method, comprising:

detecting vehicle conditions of a subject vehicle and a traveling environment for vehicle surroundings;

calculating a first risk potential expressing a risk in a case where driving conditions of the subject vehicle are in a steady state and a second risk potential expressing a risk for a case where the driving conditions of the subject vehicle are in a transient state based on the detected vehicle conditions and traveling environment;

calculating a weighting variable for setting weighting of the first risk potential and the second risk potential based on the vehicle conditions and traveling environment;

determining a first coefficient multiplied to the first risk potential and a second coefficient multiplied to the second risk potential based on the calculated weighting variable; and calculating the risk potential for the vehicle surroundings by adding the first risk potential multiplied by the first coefficient and the second risk potential multiplied by the second coefficient.

* * * * *